United States Patent
Yoshida et al.

(10) Patent No.: US 9,377,620 B2
(45) Date of Patent: Jun. 28, 2016

(54) OPTICAL SCANNING DEVICE, IMAGE FORMING APPARATUS, APERTURE FIXING METHOD

(71) Applicant: KYOCERA Document Solutions Inc., Osaka-shi, Osaka (JP)

(72) Inventors: Shingo Yoshida, Osaka (JP); Takayuki Kurihara, Osaka (JP); Hideji Mizutani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/724,699

(22) Filed: May 28, 2015

(65) Prior Publication Data

US 2015/0346486 A1   Dec. 3, 2015

(30) Foreign Application Priority Data

May 29, 2014   (JP) ................. 2014-111643

(51) Int. Cl.

| | |
|---|---|
| *G03G 15/00* | (2006.01) |
| *G02B 26/12* | (2006.01) |
| *G03G 15/04* | (2006.01) |
| *G02B 7/00* | (2006.01) |
| *G02B 5/00* | (2006.01) |
| *G03G 21/16* | (2006.01) |

(Continued)

(52) U.S. Cl.
CPC .............. *G02B 26/124* (2013.01); *G02B 5/005* (2013.01); *G02B 7/003* (2013.01); *G02B 7/004* (2013.01); *G03G 15/04* (2013.01); *G03G 15/0409* (2013.01); *G03G 15/04072* (2013.01); *G03G 21/1666* (2013.01); *G03G 2215/0132* (2013.01); *G03G 2215/0404* (2013.01); *Y10T 156/10* (2015.01)

(58) Field of Classification Search
CPC ............ G03G 15/04; G03G 15/04072; G03G 15/0409; G03G 21/1666; G03G 2215/0132; G03G 2215/0404; G02B 26/124; G02B 5/005; G02B 7/003; G02B 7/004; Y10T 156/10
See application file for complete search history.

(56) References Cited

U.S. PATENT DOCUMENTS

| | | | |
|---|---|---|---|
| 9,128,291 | B2 * | 9/2015 | Nagatoshi ............ G03G 15/043 |
| 2006/0092997 | A1 | 5/2006 | Lee |
| 2006/0209162 | A1 | 9/2006 | Choi et al. |

FOREIGN PATENT DOCUMENTS

| | | |
|---|---|---|
| EP | 1024012 A2 | 8/2000 |
| JP | 04021811 A | 1/1992 |
| JP | H10010447 A | 1/1998 |
| JP | 2011137922 A | 7/2011 |

OTHER PUBLICATIONS

European Patent Office, Extended European Search Report Issued in Application No. 15169545.9, Oct. 22, 2015, Germany, 7 pages.

* cited by examiner

*Primary Examiner* — Susan Lee
(74) *Attorney, Agent, or Firm* — Alleman Hall McCoy Russell & Tuttle LLP

(57) ABSTRACT

An optical scanning device includes a cylindrical aperture, a support member, and a base portion. In the aperture, an opening portion restricts a beam path width of a laser beam emitted from a light source. The support member includes a cylinder supporting portion that pivotably supports the aperture. To the base portion, the support member is fixed by adhesion fixing. The base portion includes a pass-through portion that passes through between front and rear surfaces of the base portion and allows the support member to move in direction perpendicular to a pivoting axis of the aperture. The support member has a length such that its lower end portion projects from a rear surface of the base portion in the state where the support member has been inserted in the pass-through portion to such a position where laser beam is incident in the opening portion of the aperture.

7 Claims, 21 Drawing Sheets

OPTICAL SCANNING DEVICE, IMAGE FORMING APPARATUS, APERTURE FIXING METHOD

INCORPORATION BY REFERENCE

This application is based upon and claims the benefit of priority from the corresponding Japanese Patent Application No. 2014-111643 filed on May 29, 2014, the entire contents of which are incorporated herein by reference.

BACKGROUND

The present disclosure relates to an optical scanning device for scanning a laser beam, an image forming apparatus including the optical scanning device, and an aperture fixing method for use in the optical scanning device.

An electrophotographic image forming apparatus includes an optical scanning device that forms an electrostatic latent image on a photoconductor by scanning a laser beam over the surface of the photoconductor. The optical scanning device includes a light source and a polygon mirror, wherein the light source emits a laser beam, and the polygon mirror scans the laser beam emitted from the light source. In addition, in the optical scanning device, an aperture is provided between the light source and the polygon mirror, wherein the aperture has an opening portion that restricts the beam path width of the laser beam.

Meanwhile, some optical scanning devices may include an adjustment mechanism for adjusting the fixed state of the aperture. More specifically, there is known an adjustment mechanism that can rotate the aperture around the optical axis of the laser beam as the rotation axis, based on the screw-depth of a screw that is screwed into a screw hole provided in a fixing tool that pivotably supports the aperture. In addition, there is known an adjustment mechanism that can move the aperture in a direction perpendicular to the optical axis of the laser beam, based on the screw-depth of a screw that is screwed into a screw hole provided in a fixing tool that swayably supports the aperture.

SUMMARY

An optical scanning device according to an aspect of the present disclosure includes a cylindrical aperture, a support member, and a base portion. In the aperture, an opening portion is formed. The opening portion restricts a beam path width of a laser beam emitted from a light source. The support member includes a cylinder supporting portion that pivotably supports the aperture. To the base portion, the support member is fixed by adhesion fixing. The base portion includes a pass-through portion that is formed to pass through between a front surface and a rear surface of the base portion and allows the support member to move in a direction perpendicular to a pivoting axis of the aperture. The support member has a length such that a lower end portion thereof projects from a rear surface of the base portion in a state where the support member has been inserted in the pass-through portion of the base portion to such a position where the laser beam is incident in the opening portion of the aperture.

An image forming apparatus according to another aspect of the present disclosure includes an optical scanning device. The optical scanning device includes a cylindrical aperture, a support member, and a base portion. In the aperture, an opening portion is formed. The opening portion restricts a beam path width of a laser beam emitted from a light source. The support member includes a cylinder supporting portion that pivotably supports the aperture. To the base portion, the support member is fixed by adhesion fixing. The base portion includes a pass-through portion that is formed to pass through between a front surface and a rear surface of the base portion and allows the support member to move in a direction perpendicular to a pivoting axis of the aperture. The support member has a length such that a lower end portion thereof projects from a rear surface of the base portion in a state where the support member has been inserted in the pass-through portion of the base portion to such a position where the laser beam is incident in the opening portion of the aperture.

An aperture fixing method according to a still another aspect of the present disclosure is a method for executing a first step, a second step, a third step, and a fourth step described below in the optical scanning device. In the first step, a position of the support member in a direction perpendicular to the pivoting axis of the aperture is adjusted by moving the support member in the pass-through portion of the base portion. In the second step, the support member whose position has been adjusted in the first step is fixed to the base portion by adhesion fixing. In the third step, a rotation position of the opening portion around the pivoting axis of the aperture is adjusted by pivoting the aperture supported by the support member that has been fixed to the base portion. In the fourth step, the aperture whose rotation position has been adjusted in the third step is fixed to the support member by adhesion fixing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

[First Embodiment]

The following describes embodiments of the present disclosure with reference to the drawings, for the understanding of the disclosure. It is noted that embodiments described in the following are merely concrete examples of the present disclosure, and are not intended to limit the technical scope of the present disclosure.

[Outlined Configuration of Image Forming Apparatus 10]

First, an outlined configuration of an image forming apparatus 10 in an embodiment of the present disclosure is described.

Figure 1:
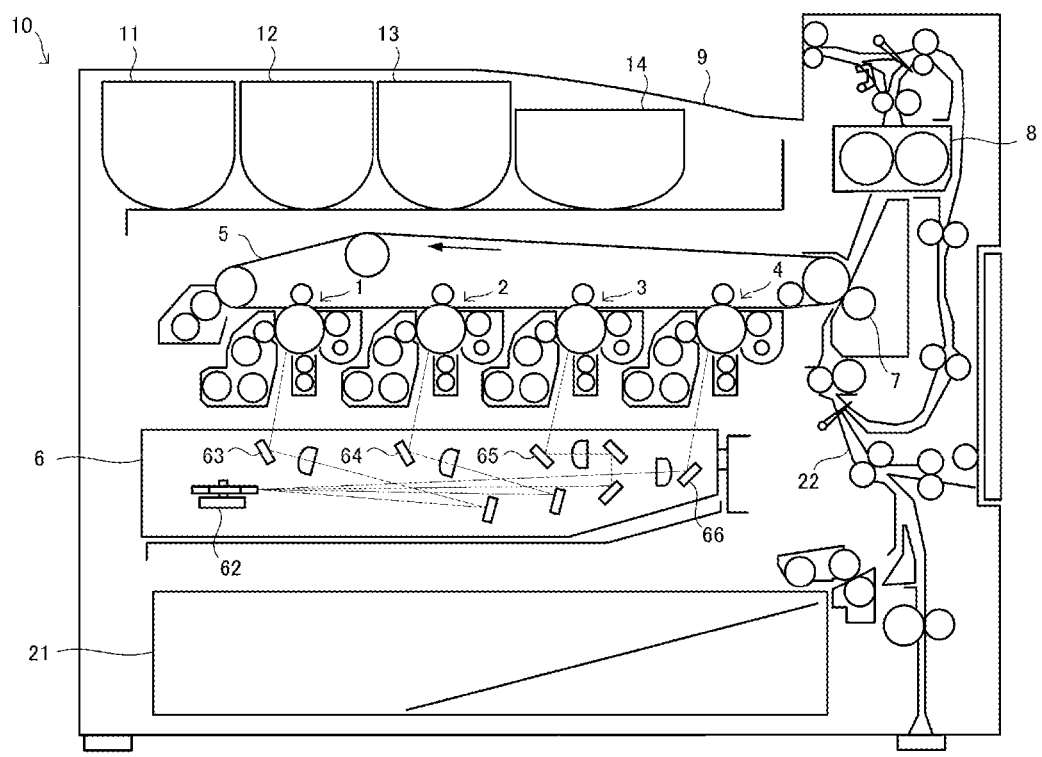
FIG. 1 is a diagram showing the configuration of an image forming apparatus according to the first embodiment of the present disclosure.

As shown in FIG. 1, the image forming apparatus 10 is a color printer including a plurality of image forming units 1-4, an intermediate transfer belt 5, an optical scanning device 6, a secondary transfer roller 7, a fixing device 8, a sheet discharge tray 9, a sheet feed cassette 21, and a conveyance path 22. The image forming apparatus 10 forms a monochrome image or a color image on a sheet based on input image data. It is noted that the sheet is a sheet-like material such as a sheet of paper, a sheet of coated paper, a postcard, an envelope, or an OHP sheet. In addition, other examples of the image forming apparatus of the present disclosure include a facsimile, a copier, and a multifunction peripheral.

The image forming units 1-4 are electrophotographic image forming units each including a photoconductor drum, a charging device, a developing device, a primary transfer roller, and a cleaning device. The image forming units 1-4 are arranged in an alignment along the running direction (horizontal direction) of the intermediate transfer belt 5, and form an image forming portion of a so-called tandem method. Specifically, the image forming unit 1 forms a toner image corresponding to C (cyan), the image forming unit 2 forms a toner image corresponding to M (magenta), the image forming unit 3 forms a toner image corresponding to Y (yellow), and the image forming unit 4 forms a toner image corresponding to K (black).

The intermediate transfer belt 5 is an intermediate transfer member on which the toner images of the respective colors are intermediately transferred from the photoconductor drums of the image forming units 1-4. The optical scanning device 6 forms electrostatic latent images on the photoconductor drums of the image forming units 1-4, by irradiating laser beams onto the photoconductor drums based on the input image data of the respective colors.

In the image forming apparatus 10 configured as such, a color image is formed in the following procedure on a sheet supplied from the sheet feed cassette 21 along the conveyance path 22, and the sheet with the image formed thereon is discharged onto the sheet discharge tray 9. It is noted that various types of conveyance rollers are provided in the conveyance path 22 in such a way as to convey a sheet stacked on the sheet feed cassette 21 to the sheet discharge tray 9 via the secondary transfer roller 7 and the fixing device 8.

First, in the image forming units 1-4, the charging devices charge the surfaces of the photoconductor drums uniformly to a certain potential. Next, the optical scanning devices 6 irradiate the surfaces of the photoconductor drums with laser beams based on the image data. With this operation, electrostatic latent images are formed on the surfaces of the photoconductor drums. The electrostatic latent images on the photoconductor drums are developed (visualized) as toner images of respective colors by the developing devices. It is noted that toners (developers) are supplied from toner containers 11-14 of respective colors that are configured to be attachable/detachable.

Subsequently, the toner images of respective colors formed on the photoconductor drums of the image forming units 1-4 are transferred by the primary transfer rollers in sequence onto the intermediate transfer belt 5 so as to be overlaid thereon. With this operation, a color image is formed on the intermediate transfer belt 5 based on the image data. Next, the color image on the intermediate transfer belt 5 is transferred by the secondary transfer roller 7 onto the sheet that has been conveyed from the sheet feed cassette 21 via the conveyance path 22. Subsequently, the color image transferred on the sheet is heated by the fixing device 8 so as to be fused and fixed onto the sheet. It is noted that the toner that has remained on the surfaces of the photoconductor drums is removed by the cleaning devices.

In addition, the image forming apparatus 10 includes a contact/separation mechanism (not shown) that causes the photoconductor drums and the first transfer rollers of the image forming units 1-3 to contact and separate from the intermediate transfer belt 5. When a monochrome image is printed in the image forming apparatus 10, the contact/separation mechanism causes the photoconductor drums and the first transfer rollers of the image forming units 1-3 to separate from the intermediate transfer belt 5. With this operation, only a black toner image is transferred from the image forming unit 4 to the intermediate transfer belt 5, and a monochrome image is transferred from the intermediate transfer belt 5 to the sheet.

[Configuration of Optical Scanning Device 6]

Next, details of the optical scanning device 6 are described with reference to FIGS. 2-8.

Figure 2:
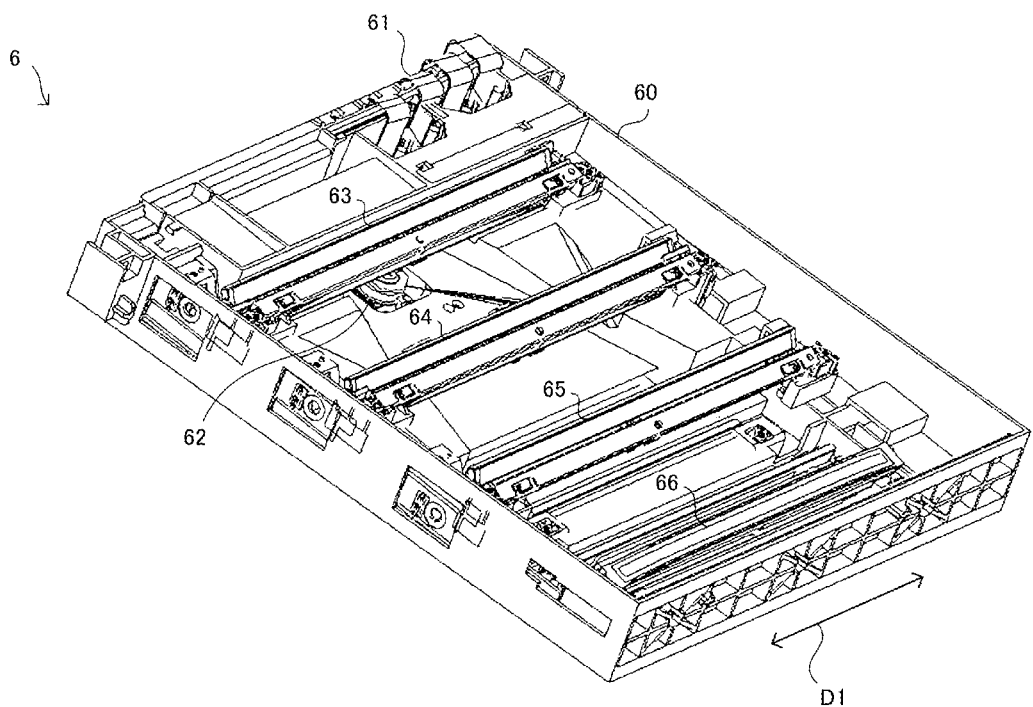
FIG. 2 is a diagram showing the configuration of an optical scanning device according to the first embodiment of the present disclosure.

As shown in FIG. 2, the optical scanning device 6 includes a unit housing 60, a light source unit 61, a polygon mirror (an example of the scanning member) 62, and outgoing mirrors 63-66. In the optical scanning device 6, laser beams respectively corresponding to the image forming units 1-4 are emitted from the light source unit 61 and are deflected and scanned in a main scanning direction D1 by the polygon mirror 62. The laser beams scanned by the polygon mirror 62 are guided to the outgoing mirrors 63-66 via optical elements such as various types of lenses or mirrors. Subsequently, the laser beams reflected on the outgoing mirrors 63-66 are irradiated onto the photoconductor drums of the image forming units 1-4. It is noted that a direction perpendicular to the main scanning direction D1 on the surface of each photoconductor drum and a direction perpendicular to the main scanning direction D1 on the surface of the polygon mirror 62 are both referred to as a sub scanning direction D2.

Figure 3:
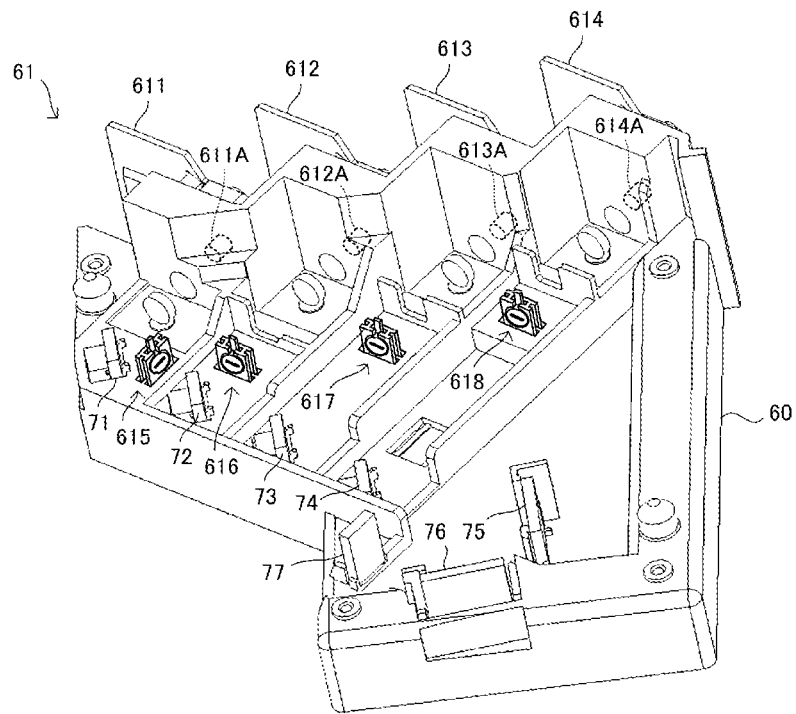
FIG. 3 is a diagram showing the configuration of a light source unit of the optical scanning device according to the first embodiment of the present disclosure.

Here, as shown in FIG. 3, the light source unit 61 includes LD boards 611-614, outgoing optical systems 615-618, reflection mirrors 71-76, and a cylindrical lens 77. The LD boards 611-614 are boards on which laser diodes 611A-614A are mounted as the light sources that emit laser beams that respectively correspond to the photoconductor drums. The outgoing optical systems 615-618 emit, as parallel luminous fluxes, the laser beams emitted from the laser diodes 611A-614A respectively, and restrict the beam path widths of the laser beams.

It is noted that the laser diodes 611A-614A each may be a single-beam laser diode which emits a single laser beam, or may be a monolithic multi-beam laser diode which emits a plurality of laser beams. It is noted that when the laser diodes 611A-614A are monolithic multi-beam laser diodes, the optical scanning device 6 can write electrostatic latent images on the photoconductor drums by using a plurality of lines simultaneously.

The reflection mirrors 71-74 reflect, toward the reflection mirror 75, laser beams emitted from the outgoing optical systems 615-618. The reflection mirror 75 reflects the laser beams toward the reflection mirror 76, and the reflection mirror 76 reflects the laser beams toward the cylindrical lens 77. The cylindrical lens 77 is an example of a converging lens that forms a linear image on the reflection surface (deflection surface) of the polygon mirror 62 by converging the laser beams in the sub scanning direction D2. Here, the laser beams are incident on the cylindrical lens 77 at different positions along the sub scanning direction D2 and incident on the polygon mirror 62 at different angles. With this configuration, the laser beams reflected on the polygon mirror 62 are guided to the outgoing mirrors 63-66 separately, and then guided to the photoconductor drums of the image forming units 1-4. In this way, in the optical scanning device 6, the cylindrical lens 77 and the polygon mirror 62 are used in common to scan the plurality of laser beams.

In the optical scanning device 6, the outgoing optical systems 615-618 include an adjustment mechanism which can adjust the incident position of a laser beam in the main scanning direction D1 on the polygon mirror 62, the incident angle of the laser beam in the sub scanning direction D2, and the inclination around the optical axis of the laser beam. The adjustment mechanism adjusts the incident position of a laser beam in the main scanning direction D1 on the polygon mirror 62, the incident angle of the laser beam in the sub scanning direction D2, and the inclination around the optical axis of the laser beam. Here, when the adjustment mechanism is configured to be able to adjust the fixed state of an aperture 82 by changing the screw-depth of a screw, the screw may be loosened due to, for example, vibrations that occur during the transportation or operation of the image forming apparatus 10, resulting in a change of the fixed state of the aperture 82. On the other hand, the image forming apparatus 10 can adjust the fixed state of the aperture 82 without using a screw. This characteristic is described in the following in detail.

Figure 4:
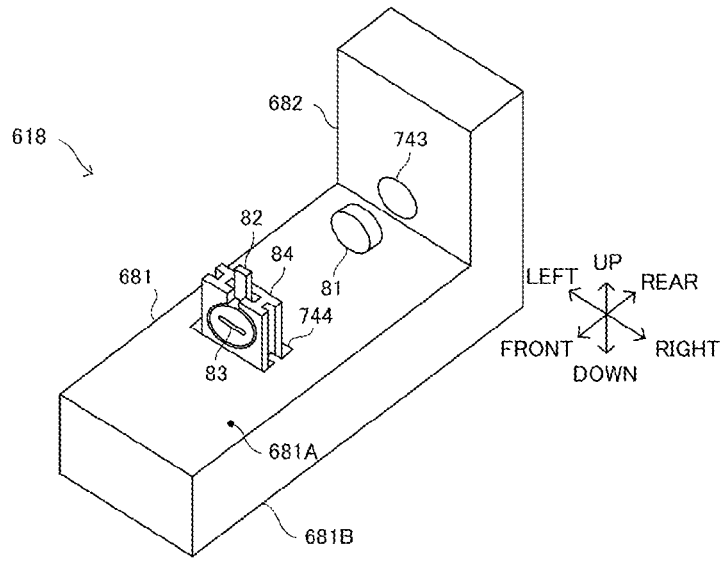
FIG. 4 is a diagram showing the configuration of an outgoing optical system of the optical scanning device according to the first embodiment of the present disclosure.

FIG. 4 is a schematic diagram showing a simplified configuration of the outgoing optical system 618. In the following, the front-rear, left-right, and up-down directions defined on FIGS. 4-8 may be used for the sake of explanation. It is noted that although the configuration of the adjustment mechanism is described by taking the outgoing optical system 618 as an example, a similar adjustment mechanism is provided in each of the outgoing optical systems 615-617. That is, the optical scanning device 6 includes a plurality of sets of the aperture 82, a support member 84, and a pass-through portion 744 that constitute the adjustment mechanism as described below, in correspondence with the laser diodes 611A-614A respectively.

The outgoing optical system 618 includes a base portion 681, a wall portion 682, a collimator lens 81, an aperture 82, and a support member 84. The base portion 681 and the wall portion 682 constitute a part of the unit housing 60. The wall portion 682 has a pass-through portion 743 in which the laser diode 614A mounted on the LD board 614 can be inserted.

The base portion 681 includes the pass-through portion 744 that passes through between a front surface 681A and a rear surface 681B of the base portion 681, wherein the support member 84 can be inserted in the pass-through portion 744. In the state where the support member 84 is inserted in the pass-through portion 744, the support member 84 is fixed to the base portion 681 by adhesion fixing using adhesive. It is noted that the base portion 681 is an example of the first base portion, and the pass-through portion 744 is an example of the first pass-through portion.

The collimator lens 81 is fixed to the base portion 681 by adhesion fixing using adhesive. The collimator lens 81 causes the laser beam emitted from the laser diode 614A of the LD board 614, to become a parallel luminous flux, and emits the parallel luminous flux. The aperture 82 includes an opening portion 83 that restricts, to a width in a predetermined range, the beam path width in the main scanning direction D1 and the sub scanning direction D2 of the laser beam which is traveling from the collimator lens 81 to the reflection mirror 74. It is noted that the aperture 82 is an example of the first aperture, and the opening portion 83 is an example of the first opening portion. The support member 84 supports the aperture 82, and is configured as a different member from the base portion 681.

Figure 5:
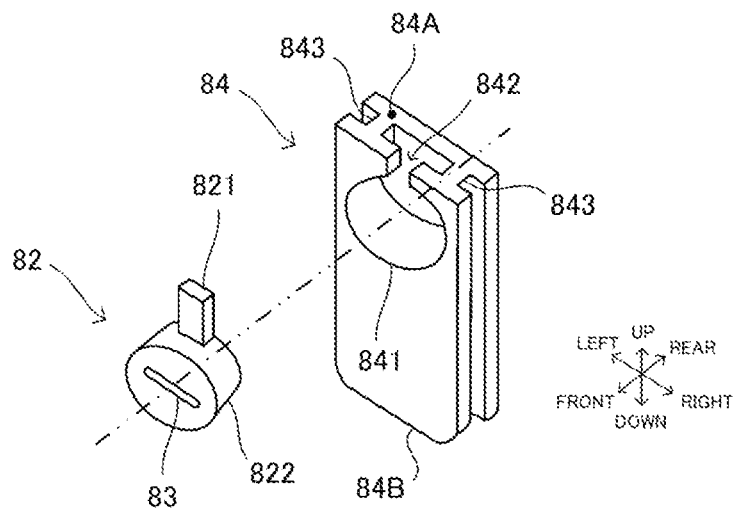
FIG. 5 is a diagram showing components of the outgoing optical system of the optical scanning device according to the first embodiment of the present disclosure.

FIG. 5 is a diagram showing the configuration of the aperture 82 and the support member 84. As shown in FIG. 5, the aperture 82 includes an operation portion 821 and a cylindrical portion 822. The cylindrical portion 822 is formed in the shape of a cylinder whose axis is the center of the opening portion 83. The opening portion 83 of the aperture 82 is formed to pass through between a top surface and a bottom surface of the cylindrical portion 822. The operation portion 821 is formed to project from the circumferential surface of the cylindrical portion 822 in a direction perpendicular to the longitudinal direction of the opening portion 83. Furthermore, the operation portion 821 has such a length that the upper end thereof projects upward from the support member 84 in the state where the aperture 82 is supported by the support member 84.

The support member 84 includes a cylinder supporting portion 841, a cut portion 842, and groove portions 843. The cylinder supporting portion 841 is formed to extend between a front surface and a rear surface of the support member 84, and pivotably supports the cylindrical portion 822 of the aperture 82. The cut portion 842 is formed in an upper end portion 84A of the support member 84 to avoid an interruption with the operation portion 821 of the aperture 82 when the cylindrical portion 822 of the aperture 82 is inserted into the cylinder supporting portion 841.

Here, the support member 84 has such a length that a lower end portion 84B thereof projects from a rear surface 681B of the base portion 681 in the state where the support member 84 has been inserted in the pass-through portion 744 to such a position where the laser beam is incident in the opening portion 83 of the aperture 82. In particular, the distance between the lower end portion 84B and a lower end position of the cylinder supporting portion 841 of the support member 84 is designed to be larger than the thickness of the base portion 681 by a predetermined adjustment width. In addition, the groove portions 843 are formed to extend in the up-down direction that is the longitudinal direction of the support member 84, respectively on the left side surface and the right side surface of the support member 84.

Figure 6:
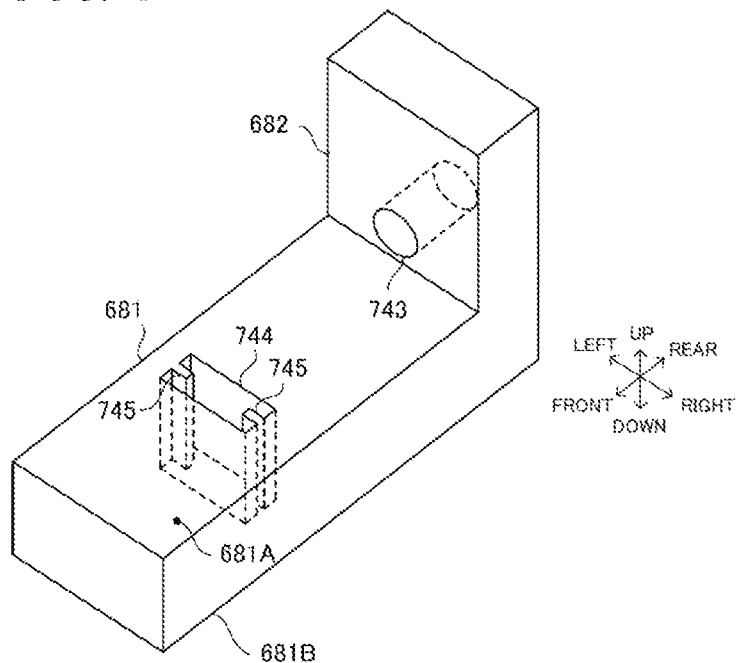
FIG. 6 is a diagram showing components of the outgoing optical system of the optical scanning device according to the first embodiment of the present disclosure.

Here, FIG. 6 is a diagram showing the configuration of the base portion 681. As shown in FIG. 6, the pass-through portion 744 formed in the base portion 681 includes restriction portions 745 that are projections respectively projecting from the left and right end portions toward the inside of the pass-through portion 744, wherein the restriction portions 745 are configured to be inserted in the groove portions 843 of the support member 84. The restriction portions 745 are formed to extend between the front surface and the rear surface of the base portion 681. In addition, the restriction portions 745, when inserted in the groove portions 843 of the support member 84, restrict the movement of the support member 84 in the front-rear direction, which is a direction along the pivoting axis of the aperture 82. On the other hand, in the pass-through portion 744, the movement of the support member 84 in the up-down direction and the left-right direction (the main scanning direction D1 and the sub scanning direction D2) that are perpendicular to the pivoting axis of the aperture 82 is allowed within a predetermined adjustment range.

In the outgoing optical system 618 which is configured as described above, after the support member 84 is inserted in the pass-through portion 744 of the base portion 681, it is possible to adjust the position of the aperture 82 in the up, down, left and right directions and the rotation position of the aperture 82 around the optical axis of the laser beam that is incident in the aperture 82.

Figure 7:
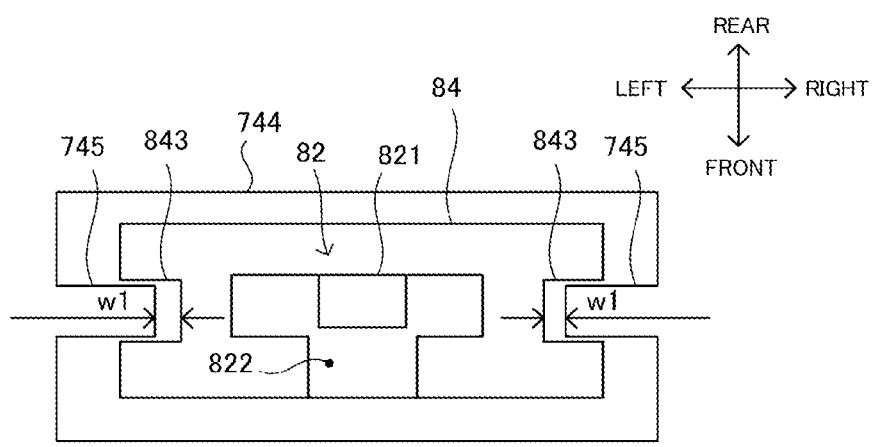
FIG. 7 is a diagram for explaining the function of an adjustment mechanism of the optical scanning device according to the first embodiment of the present disclosure.

Here, FIG. 7 is a schematic diagram, viewed from above, showing the state where the support member 84 is inserted in the pass-through portion 744 of the base portion 681. As shown in FIG. 7, in the state where the support member 84 is inserted in the pass-through portion 744, a gap with a predetermined adjustment width w1 is formed in each of the left and right groove portions 843, wherein the adjustment width w1 is set with respect to the restriction portions 745 in advance and extends in the left-right direction. That is, in this state, the support member 84 can be moved in the main scanning direction D1 in the pass-through portion 744 within a width range that is twice as large as the adjustment width w1. With this configuration, when the optical scanning device 6 is assembled, it is possible to adjust the incident position of the laser beam in the main scanning direction D1 on the polygon mirror 62.

Furthermore, the support member 84 can be moved in the up-down direction along the restriction portions 745 in the state where the restriction portions 745 are inserted in the groove portions 843. With this configuration, when the optical scanning device 6 is assembled, it is possible to change the incident position of the laser beam on the cylindrical lens 77, and adjust the incident angle of the laser beam in the sub scanning direction D2 on the polygon mirror 62.

In the outgoing optical system 618, after the position of the support member 84 in the pass-through portion 744 in the up-down direction and left-right direction is adjusted, the support member 84 is fixed to the base portion 681 by adhesion fixing using adhesive. At this time, for example, a photocurable resin that is cured by ultraviolet irradiation is used as the adhesive. In that case, it is necessary to irradiate ultraviolet light on the photocurable resin after the photocurable resin is applied to the support member 84 and the pass-through portion 744. Here, if the support member 84 could be held only by the upper end portion 84A of the support member 84, the chuck portion of the robot arm or the hand of the worker that would be holding the support member 84 would interrupt with the application of the photocurable resin and the irradiation of the ultraviolet light on the photocurable resin.

In the outgoing optical system 618, however, the lower end portion 84B of the support member 84 projects from the rear surface 681B of the base portion 681 in the state where the support member 84 has been inserted in the pass-through portion 744 to such a position where the laser beam is incident in the opening portion 83 of the aperture 82. As a result, it is possible to apply the photocurable resin to the support member 84 and the pass-through portion 744 and irradiate the ultraviolet light on the photocurable resin from above in the state where the chuck portion of the robot arm or the hand of the worker is holding the lower end portion 84B of the support member 84 on the rear surface 681B side of the base portion 681. It is noted that the photocurable resin may be applied to the support member 84 and the pass-through portion 744 from the rear surface 681B side of the base portion 681 and the ultraviolet light may be irradiated on the photocurable resin from the rear surface 681B side of the base portion 681 in the state where the upper end portion 84A of the support member 84 is held.

Figure 8A:
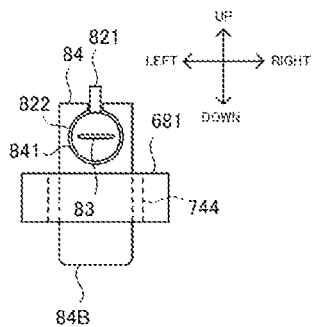
FIGS. 8A-8C are diagrams for explaining the function of the adjustment mechanism of the optical scanning device according to the first embodiment of the present disclosure.
Figure 8B:
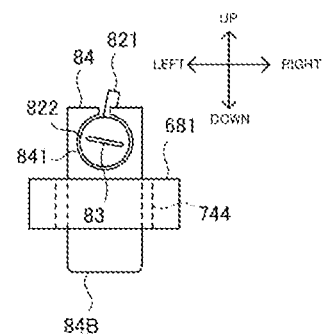
Figure 8C:
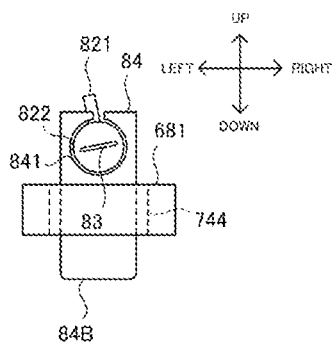

FIGS. 8A-8C are front views showing the state where the support member 84 is inserted in the pass-through portion 744 of the base portion 681. In the support member 84, as shown in FIG. 8A, the cylindrical portion 822 of the aperture 82 is pivotably supported by the cylinder supporting portion 841. In addition, as shown in FIGS. 8B and 8C, when the operation portion 821 is moved in the left-right direction, the aperture 82 pivots around the center of the opening of the cylinder supporting portion 841 and the center of the cylindrical portion 822 as the pivoting axis. With this configuration, when the optical scanning device 6 is assembled, it is possible to adjust the inclination around the optical axis of the laser beam on the polygon mirror 62. It is noted that the inclination around the optical axis of the laser beam occurs, for example, due to an installation error of various types of mirrors that are disposed in the light source unit 61.

As described above, the optical scanning device 6 includes an adjustment mechanism that can adjust the incident position of a laser beam in the main scanning direction D1 on the polygon mirror 62, the incident angle of the laser beam in the sub scanning direction D2, and the inclination around the optical axis of the laser beam, by adjusting the fixed state of the aperture 82. In addition, the adjustment mechanism has a simple configuration where a screw or the like is not used. This makes it possible to reduce the number of parts and the cost. Furthermore, the configuration facilitates the work of fixing the support member 84 to the base portion 681 by adhesion fixing. As a result, it is possible to fix the aperture 82 stably in a desired fixed state by using adhesive such as photocurable resin.

[Aperture Fixing Method in Optical Scanning Device 6 of First Embodiment]

Figure 9:
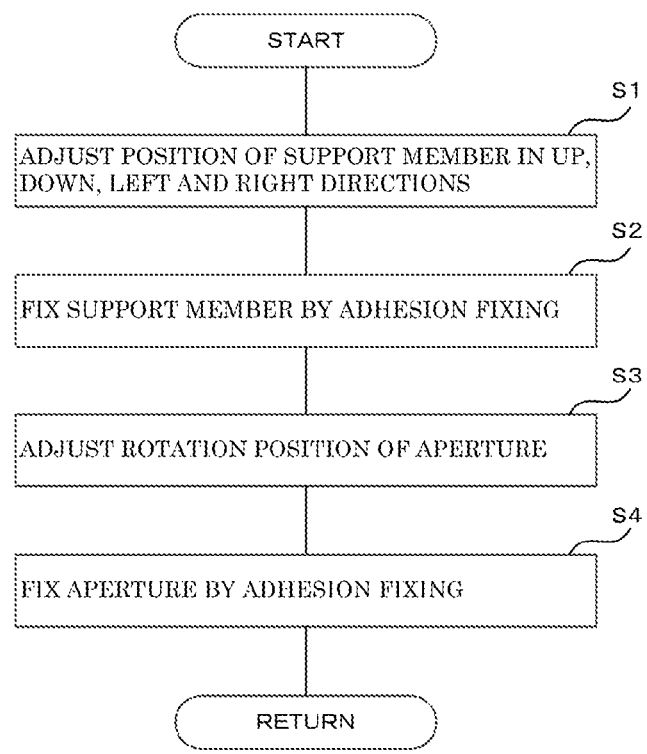
FIG. 9 is a flowchart for explaining an aperture fixing method used in the optical scanning device according to the first embodiment of the present disclosure.

Here, with reference to FIG. 9, a description is given of the work process executed as a fixing method of the aperture 82 in the optical scanning device 6. The work process is executed by, for example, a robot arm or a worker who performs the assembling of the optical scanning device 6.

First, in step S1, the position of the support member 84 in the up-down direction and the left-right direction (the main scanning direction D1 and the sub scanning direction D2) that are perpendicular to the pivoting axis of the aperture 82 is adjusted by moving the support member 84 in the pass-through portion 744 of the base portion 681.

Next, in step S2, the support member 84 whose position has been adjusted in the step S2 is fixed to the base portion 681 by adhesion fixing using adhesive. Here, a photocurable resin that is cured by ultraviolet irradiation is used as the adhesive. More specifically, the photocurable resin is applied to between the support member 84 and the pass-through portion 744, and then ultraviolet light is irradiated on the photocurable resin. At this time, since the lower end portion 84B of the support member 84 projects from the bottom surface of the base portion 681, it is possible to perform with ease the application of the photocurable resin and the irradiation of ultraviolet light on the photocurable resin from above the base portion 681, in the state where the lower end portion 84B of the support member 84 is held.

Subsequently, in step S3, the rotation position of the aperture 82 is adjusted by pivoting the aperture 82 by operating the operation portion 821 of the aperture 82 supported by the support member 84 fixed to the base portion 681.

In step S4, the aperture 82 whose rotation position has been adjusted in the step S3 is fixed to the support member 84 by adhesion fixing using adhesive. In this case, too, a photocurable resin that is cured by ultraviolet irradiation is used as the adhesive. More specifically, the photocurable resin is applied to between the cylindrical portion 822 of the aperture 82 and the cut portion 842 of the support member 84, and then ultraviolet light is irradiated on the photocurable resin. At this time, since the operation portion 821 of the aperture 82 projects upward from the cylindrical portion 822, it is possible to perform with ease the application of the photocurable resin to the cut portion 842 and the irradiation of ultraviolet light on the photocurable resin in the state where the operation portion 821 of the aperture 82 is held.

[Second Embodiment]

Meanwhile, the adjustment of the fixed state of the aperture 82 may be performed while photographing the laser beam by a camera including an imaging element such as CCD. For example, during the adjustment work, the camera may be disposed between the reflection mirrors 71-74 and the reflection mirror 75, or between the cylindrical lens 77 and the polygon mirror 62, and after the adjustment work, the camera may be removed.

Figure 10A:
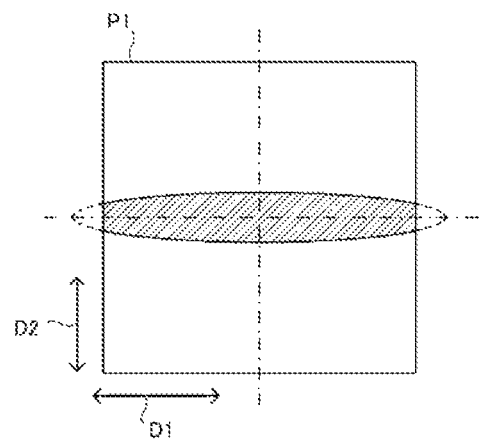
FIGS. 10A-10C are diagrams showing examples of photographed images taken by a camera used for the aperture fixing method in the optical scanning device according to the first embodiment of the present disclosure.
Figure 10B:
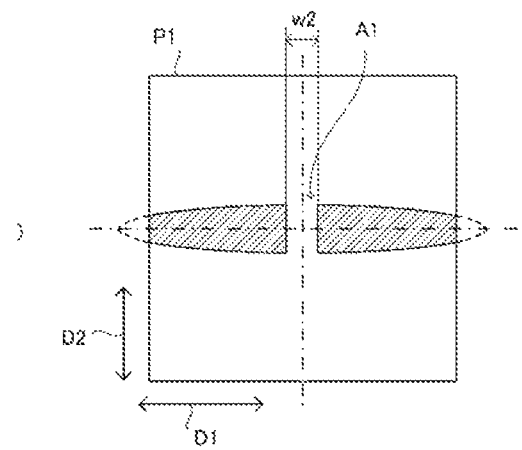
Figure 10C:
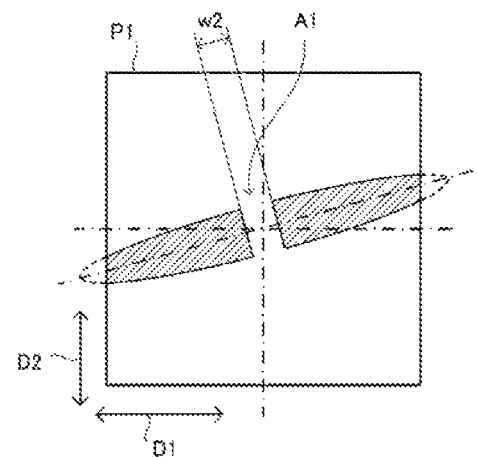

However, when, for example, the focal distance of a scanning lens such as an Fθ lens mounted in the optical scanning device 6 is long, the beam width in the main scanning direction D1 increases after the laser beam passes through the aperture 82. When the size of the camera is small relative to the beam width in the main scanning direction D1 of the laser beam, the end portions of the laser beam in the main scanning direction D1 may not be included in a photographed image P1 taken by the camera, as shown in FIG. 10A. It is noted that, as shown in FIGS. 10A-10C, the camera is disposed in the optical scanning device 6 such that the left-right direction of the photographed image P1 is parallel to the main scanning direction D1 and the up-down direction is parallel to the sub scanning direction D2. It is noted that, in FIGS. 10A-10C, the laser beam is represented by the hatched area.

Here, it may be considered to use a large-size camera to photograph the laser beam in its entirety in the main scanning direction D1. However, in that case, the setting position of the camera in the optical scanning device 6 is restricted when the fixed state of the aperture 82 is adjusted.

On the other hand, the image forming apparatus 10 according to the second embodiment described herewith provides a configuration where a small-size camera can be used when the fixed state of the aperture 82 is adjusted. It is noted that the components that are the same as those of the image forming apparatus 10 and the optical scanning device 6 described in the first embodiment are assigned the same reference signs, and description thereof is omitted.

Figure 11:
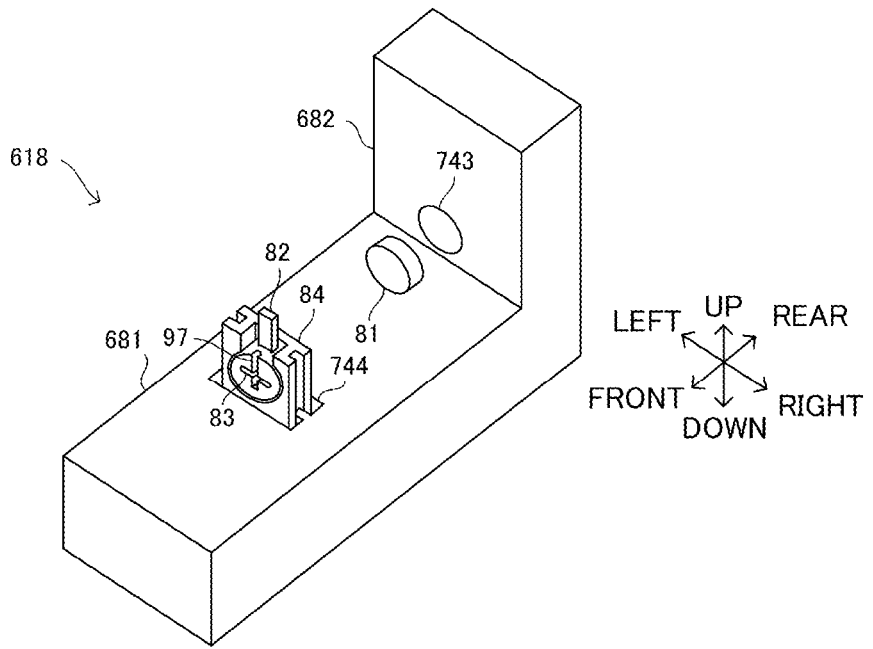
FIG. 11 is a diagram showing the configuration of an outgoing optical system of an optical scanning device according to the second embodiment of the present disclosure.

Specifically, in the image forming apparatus 10 according to the second embodiment, as shown in FIG. 11, the aperture 82 includes a cut portion 97 in which a blocking member 98 that is described below can be inserted in a direction perpendicular to the longitudinal direction of the opening portion 83. Here, the cut portion 97 is an example of the first cut portion, and the blocking member 98 is an example of the first blocking member. The cut portion 97 is formed at a predetermined position such that the center thereof in the main scanning direction D1 matches the center of the opening portion 83 in the main scanning direction D1. The cut portion 97 is an indent portion formed on the surface (namely, the front surface) of the aperture 82 on the downstream side in the emission direction of the laser beam, and does not pass through the aperture 82 in a direction along the optical axis of the laser beam. As a result, the cut portion 97 does not affect the performance of the opening portion 83 of the aperture 82 in restricting the width of the laser beam.

Figure 12:
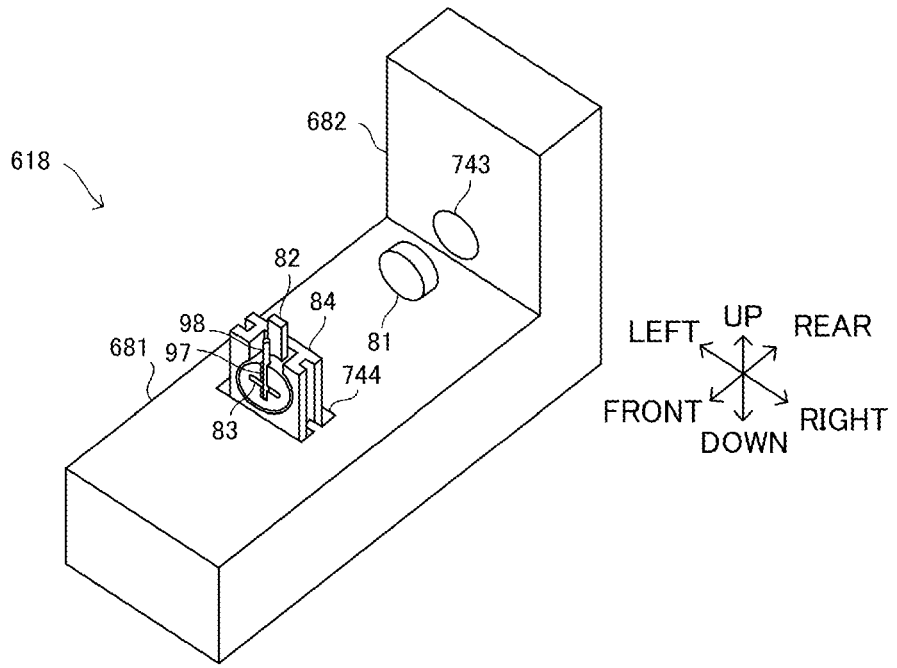
FIG. 12 is a diagram showing the configuration of the outgoing optical system of the optical scanning device according to the second embodiment of the present disclosure.

As shown in FIG. 12, the blocking member 98 which is in the shape of a long cylinder can be attached to and detached from the cut portion 97, wherein the blocking member 98 blocks the laser beam emitted from the laser diode 614A. When a photograph is taken by the camera in the state where the blocking member 98 is attached to the cut portion 97, in the photographed image P1, a part of the laser beam emitted from the laser diode 614A is blocked by the blocking member 98, as shown in FIG. 10B. At this time, a blocked area A1 that is formed in the laser beam by the blocking member 98 has a predetermined relationship with the opening portion 83 of the aperture 82. That is, the center of the opening portion 83 in the longitudinal direction thereof matches the center of the blocked area A1 in the same direction. It is noted that a border line between the blocked area A1 and the laser beam forms a line segment that is perpendicular to the longitudinal direction of the opening portion 83.

With the above-described configuration, it is possible to identify the center position in the main scanning direction D1 of the laser beam emitted from the opening portion 83 of the aperture 82, by referring to the blocked area A1 in the photographed image P1. More specifically, the center position of the laser beam is where the center of a width w2 passes through the center between the border lines of the blocked area A1 with the laser beam, wherein the width w2 extends in a direction perpendicular to the border lines. As a result, even when one or both ends of the laser beam are not included in the photographed image taken by the camera as shown in FIG. 10B, it is possible to identify the center position of the laser beam by referring to the blocked area A1. Furthermore, in the optical scanning device 6, it is possible, by using the adjustment mechanism, to adjust with ease the fixed position of the aperture 82 in the main scanning direction D1 (the left-right direction).

In addition, in the photographed image P1, the blocked area A1 generated by the blocking member 98 is inclined when the laser beam that is emitted from the aperture 82 and enters the camera is inclined around the pivoting axis of the aperture 82, as shown in FIG. 10C. As a result, it is possible to identify the inclination of the laser beam by referring to the blocked area A1 in the photographed image P1. More specifically, the inclination of a line segment matches the inclination of the laser beam, wherein the line segment passes through the center between the border lines of the blocked area A1 with the laser beam, and is perpendicular to the border lines. As a result, even when one or both ends of the laser beam are not included in the photographed image taken by the camera as shown in FIG. 10C, it is possible, by referring to the blocked area A1, to identify the inclination of the laser beam. In addition, it is possible to adjust with ease the rotation position of the aperture 82 rotated around the pivoting axis of the aperture 82.

As described above, according to the optical scanning device 6 of the second embodiment, it is possible to use a small-size camera when the fixed state of the aperture 82 is adjusted, resulting in relaxation of the restriction made to the setting position of the camera in the optical scanning device 6.

More specifically, in the optical scanning device 6 of the second embodiment, the following work process is executed in the step S1 of the work process executed as the fixing method of the aperture 82. First, the laser beam after passing through the opening portion 83 is photographed by a camera installed at a predetermined position, in the state where the blocking member 98 is inserted in the cut portion 97 of the aperture 82. Next, the center position of the laser beam in the longitudinal direction (the main scanning direction D1) of the opening portion 83 after passing through the opening portion 83, is identified based on the photographed image taken by the camera. Subsequently, the fixed state of the support member 84 is adjusted based on the identified center position of the laser beam in the longitudinal direction of the opening portion 83. In addition, the rotation position of the aperture 82 in the support member 84 is adjusted based on the photographed image taken by the camera.

[Third Embodiment]

Meanwhile, according to the above description of the first embodiment and the second embodiment, one aperture 82 is used to restrict the width of the laser beam in the main scanning direction D1 and the sub scanning direction D2. In the third embodiment provided herewith, a description is given of a configuration where the beam path widths of the laser beam in the main scanning direction D1 and the sub scanning direction D2 are restricted by individual apertures. It is noted that the components that are the same as those of the image forming apparatus 10 and the optical scanning device 6 described in the first embodiment are assigned the same reference signs, and description thereof is omitted.

Figure 13:
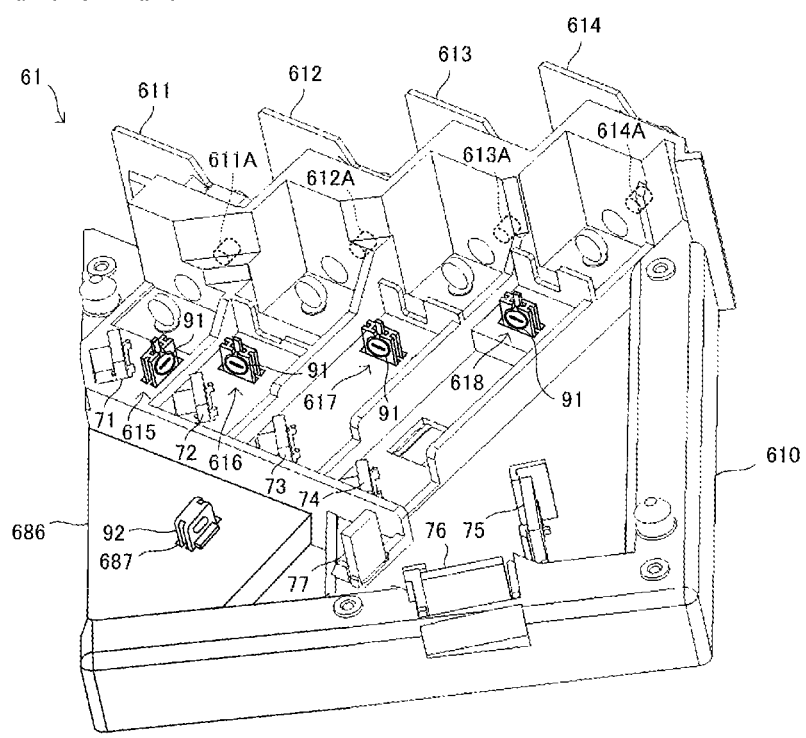
FIG. 13 is a diagram showing the configuration of a light source unit of an optical scanning device according to the third embodiment of the present disclosure.

Specifically, as shown in FIG. 13, the laser diodes 611A-614A provided in the optical scanning device 6 of the third embodiment are monolithic multi-beam laser diodes that can emit two laser beams. When the laser diodes 611A-614A are the monolithic multi-beam laser diodes, the optical scanning device 6 can write electrostatic latent images on the photoconductor drums by using two lines simultaneously. It is noted that the laser diodes 611A-614A may be configured to emit three or more laser beams.

The optical scanning device 6 of the third embodiment includes apertures 91 and an aperture 92 in place of the apertures 82. The apertures 91 are provided in correspondence with the laser diodes 611A-614A respectively.

Each aperture 91 restricts the beam path width of the laser beam in the sub scanning direction D2 that is emitted from a corresponding one of the laser diodes 611A-614A. In addition, the aperture 92 restricts the beam path width in the main scanning direction D1 of the laser beams emitted from the laser diodes 611A-614A. That is, the aperture 92 is a single aperture that is common to the laser diodes 611A-614A. Each aperture 91 is disposed between the collimator lens 81 and the cylindrical lens 77 on a base portion 683 that constitutes a part of the unit housing 60. On the other hand, the aperture 92 is disposed between the cylindrical lens 77 and the polygon mirror 62 on a base portion 686 that constitutes a part of the unit housing 60.

Figure 14A:
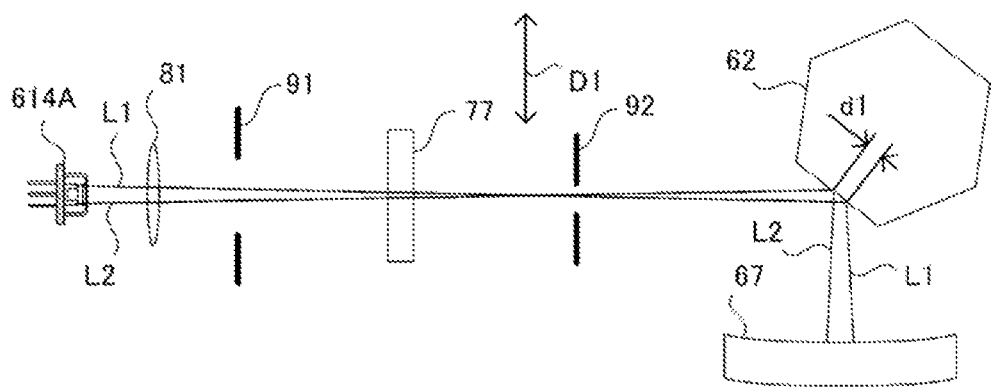
FIGS. 14A-14B are cross-section schematic diagrams in the main scanning direction showing examples of trajectories of laser beams in the optical scanning device according to the third embodiment of the present disclosure.

FIG. 14A is a cross-section schematic diagram in the main scanning direction D1 showing trajectories of laser beams in the optical scanning device 6. It is noted that in FIG. 14A, the reflection mirrors 71-76 are omitted. As shown in FIG. 14A, two laser beams L1 and L2 emitted from the laser diode 614A have respective beam emitting points that are different in position in the main scanning direction D1 and the sub scanning direction D2.

The laser beam L1 and the laser beam L2 pass through the collimator lens 81 and then the aperture 91, and enter the cylindrical lens 77. Subsequently, the laser beam L1 and the laser beam L2 emitted from the cylindrical lens 77 pass through the aperture 92 and enter the polygon mirror 62. The laser beam L1 and the laser beam L2 are then deflected and scanned by the polygon mirror 62, passed through a scanning lens such as an fθ lens and irradiated on the surface of the photoconductor drum. It is noted that the laser beam L1 and the laser beam L2 shown in FIG. 14A indicate trajectories of components of the laser beam L1 and the laser beam L2 that pass through the optical axis center of the aperture 92.

As described above, in the optical scanning device 6, the apertures 91 are disposed between the collimator lenses 81 and the cylindrical lens 77, and the aperture 92 is disposed between the cylindrical lens 77 and the polygon mirror 62. As a result, it is possible to set the position of the aperture 92 close to the polygon mirror 62 while ensuring the focal distance of the cylindrical lens 77. It is thus possible to narrow a pitch d1 between the laser beam L1 and the laser beam L2 on the polygon mirror 62. With this configuration of the optical scanning device 6 of the third embodiment, it is possible to reduce the size of the polygon mirror 62, and reduce the size of the optical scanning device 6.

Figure 14B:
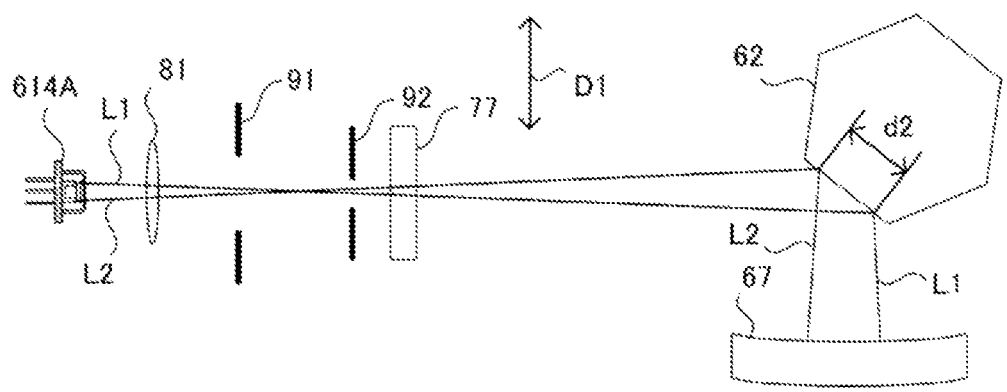

On the other hand, FIG. 14B is a cross-section schematic diagram in the main scanning direction D1 showing trajectories of laser beams in the optical scanning device 6 in an imaginary case where each aperture 91 and the aperture 92 are disposed between the collimator lens 81 and the cylindrical lens 77. It is noted that the laser beam L1 and the laser beam L2 shown in FIG. 14B, as in FIG. 14A, indicate trajectories of components of the laser beam L1 and the laser beam L2 that pass through the optical axis center of the aperture 92. In the example shown in FIG. 14B, the laser beams L1 and L2, after passing through the aperture 92, spread in the main scanning direction D1, and thus a pitch d2 between the laser beam L1 and the laser beam L2 on the polygon mirror 62 is wider than the pitch d1. As a result, the polygon mirror 62 needs to be increased in size, resulting in inhibition of the size reduction.

Next, the configuration of the apertures 91 and the aperture 92 is described with reference to FIGS. 15-22.

Figure 15:
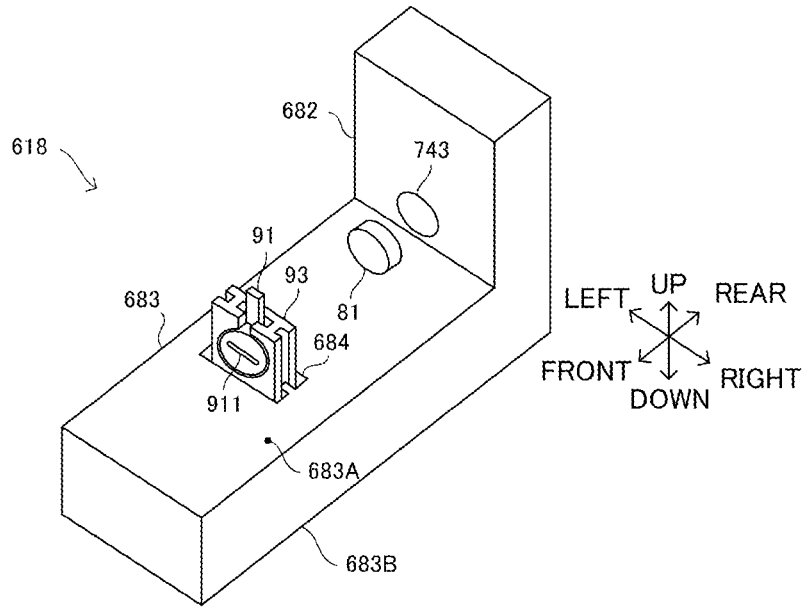
FIG. 15 is a diagram showing the configuration of an outgoing optical system of the optical scanning device according to the third embodiment of the present disclosure.

As shown in FIG. 15, the outgoing optical system 618 includes a base portion 683, the wall portion 682, the collimator lens 81, the aperture 91, and a support member 93. In the optical scanning device 6 of the third embodiment, the apertures 91, the support member 93, and a pass-through portion 684 that is described below are included in a plurality of sets of structural elements of the adjustment mechanism that are provided in correspondence with the outgoing optical systems 615-618.

The support member 93 is configured to support the apertures 91, and is provided as a different member from the base portion 683. The base portion 683 includes the pass-through portion 684 that passes through between a front surface 683A and a rear surface 683B of the base portion 683, wherein the support member 93 can be inserted in the pass-through portion 684. The support member 93 is fixed to the base portion 683 by adhesion fixing using adhesive in the state where the support member 93 is inserted in the pass-through portion 684. It is noted that the base portion 683 is an example of the second base portion.

Each aperture 91 includes an opening portion 911 configured to restrict the beam path width of the laser beam in the sub scanning direction D2 to a width in a predetermined range, the laser beam traveling from the collimator lens 81 to the reflection mirror 74. Specifically, the opening portion 911 has predetermined widths respectively in the main scanning direction D1 and the sub scanning direction D2, and the width in the sub scanning direction D2 is smaller than that of an opening portion 921 included in the aperture 92, wherein the opening portion 921 is described below. Here, the apertures 91 are an example of the second aperture, and the opening portion 911 is an example of the second opening portion.

Figure 16:
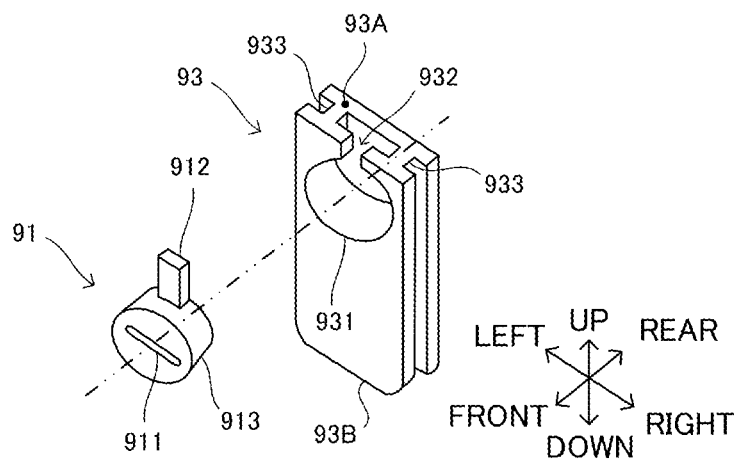
FIG. 16 is a diagram showing components of the outgoing optical system of the optical scanning device according to the third embodiment of the present disclosure.

FIG. 16 is a diagram showing the configurations of the aperture 91 and the support member 93. As shown in FIG. 16, the aperture 91 includes an operation portion 912 and a cylindrical portion 913. The cylindrical portion 913 is formed in the shape of a cylinder whose axis is the center of the opening portion 911. The opening portion 911 of the aperture 91 is formed to pass through between a top surface and a bottom surface of the cylindrical portion 913. The operation portion 912 is formed to project from the circumferential surface of the cylindrical portion 913 in a direction perpendicular to the longitudinal direction of the opening portion 911. Furthermore, the operation portion 912 has such a length that the upper end thereof projects upward from the support member 93 in the state where the aperture 91 is supported by the support member 93.

The support member 93 includes a cylinder supporting portion 931, a cut portion 932, and groove portions 933. The cylinder supporting portion 931 is formed to extend between a front surface and a rear surface of the support member 93, and pivotably supports the cylindrical portion 913 of the aperture 91. The cut portion 932 is formed in an upper end portion 93A of the support member 93 to avoid an interruption with the operation portion 912 of the aperture 91 when the cylindrical portion 913 of the aperture 91 is inserted into the cylinder supporting portion 931.

Here, a lower end portion 93B of the support member 93 has a length such that the lower end portion 93B projects from a rear surface 683B of the base portion 683 in the state where the support member 93 has been inserted in the pass-through portion 684 to such a position where the laser beam is incident in the opening portion 911 of the aperture 91. In particular, the distance between the lower end portion 93B and a lower end position of the cylinder supporting portion 931 of the support member 93 is designed to be larger than the thickness of the base portion 683 by a predetermined adjustment width. In addition, the groove portions 933 are formed to extend in the up-down direction that is the longitudinal direction of the support member 93, respectively on the left side surface and the right side surface of the support member 93.

Figure 17:
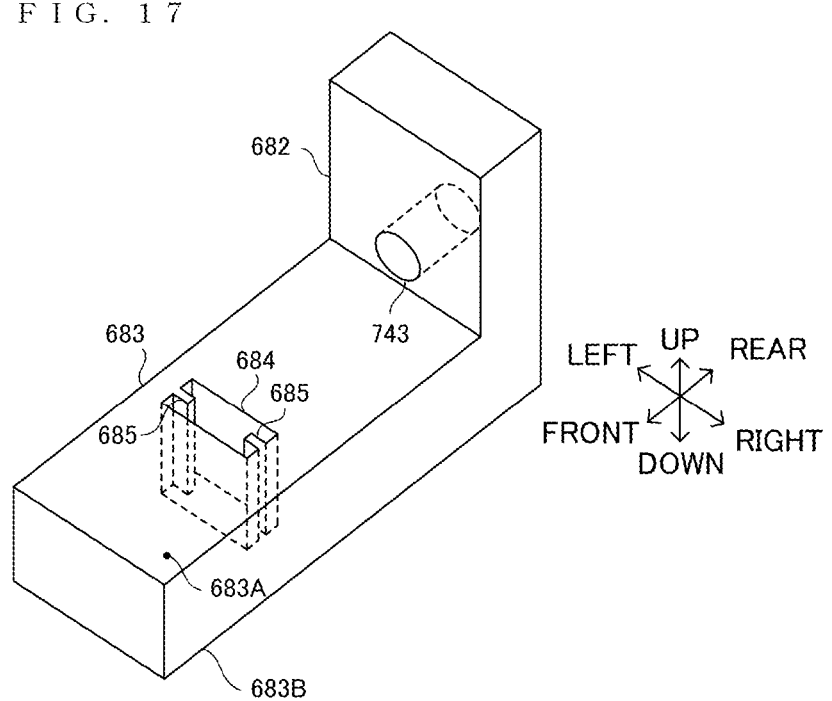
FIG. 17 is a diagram showing components of the outgoing optical system of the optical scanning device according to the third embodiment of the present disclosure.

Here, FIG. 17 is a diagram showing the configuration of the base portion 683. As shown in FIG. 17, the pass-through portion 684 of the base portion 683 includes restriction portions 685 that are projections respectively projecting from the left and right end portions toward the inside of the pass-through portion 684, and can be inserted in the groove portions 933 of the support member 93. The restriction portions 685 are formed to extend between the front surface and the rear surface of the base portion 683. In addition, the restriction portions 685, when inserted in the groove portions 933 of the support member 93, restrict the movement of the support member 93 in the front-rear direction, which is a direction along the pivoting axis of the aperture 91. On the other hand, in the pass-through portion 684, the movement of the support member 93 in the up-down direction (the sub scanning direction D2) which is perpendicular to the pivoting axis of the aperture 91 is allowed within a predetermined adjustment range. Here, the pass-through portion 684 is an example of the second pass-through portion.

In the outgoing optical system 618 which is configured as described above, after the support member 93 is inserted in the pass-through portion 684 of the base portion 683, it is possible to adjust the position of the aperture 91 in the up-down direction and the rotation position of the aperture 91 around the optical axis of the laser beam that is incident in the aperture 91.

Figure 18:
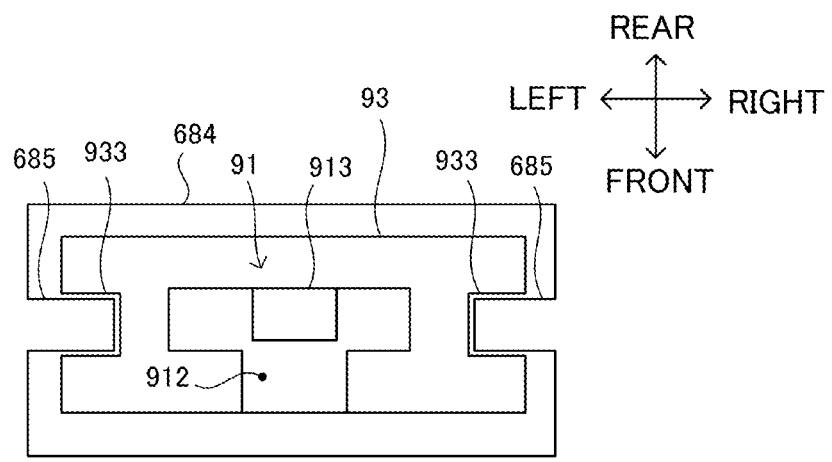
FIG. 18 is a diagram for explaining the function of an adjustment mechanism of the optical scanning device according to the third embodiment of the present disclosure.

Here, FIG. 18 is a schematic diagram, viewed from above, showing the state where the support member 93 is inserted in the pass-through portion 684 of the base portion 683. As shown in FIG. 18, in the state where the support member 93 is inserted in the pass-through portion 684, the movement of the support member 93 in the left-right direction is restricted by the groove portions 933 and the restriction portions 685. On the other hand, in the state where the restriction portions 685 are inserted in the groove portions 933, the support member 93 can be moved in the up-down direction along the restriction portions 685. With this configuration, when the optical scanning device 6 is assembled, it is possible to change the incident position of the laser beam on the cylindrical lens 77, and adjust incident angle of the laser beam in the sub scanning direction D2 on the polygon mirror 62.

In the outgoing optical system 618, after the position of the support member 93 in the up-down direction in the pass-through portion 684 is adjusted, the support member 93 is fixed to the base portion 683 by adhesion fixing using adhesive. At this time, for example, a photocurable resin that is cured by ultraviolet irradiation is used as the adhesive. In that case, it is necessary to irradiate ultraviolet light on the photocurable resin after the photocurable resin is applied to the support member 93 and the pass-through portion 684. Here, if the support member 93 could be held only by the upper end portion 93A of the support member 93, the chuck portion of the robot arm or the hand of the worker that would be holding the support member 93 would interrupt with the application of the photocurable resin and the irradiation of the ultraviolet light on the photocurable resin.

In the outgoing optical system 618, however, the lower end portion 93B of the support member 93 projects from the rear surface 683B of the base portion 683 in the state where the support member 93 has been inserted in the pass-through portion 684 to such a position where the laser beam is incident in the opening portion 911 of the aperture 91. As a result, it is possible to apply the photocurable resin to the support member 93 and the pass-through portion 684 and irradiate the ultraviolet light on the photocurable resin from above in the state where the chuck portion of the robot arm or the hand of the worker is holding the lower end portion 93B of the support member 93 on the rear surface 683B side of the base portion 683. It is noted that the photocurable resin may be applied to the support member 93 and the pass-through portion 684 from the rear surface 683B side of the base portion 683 and the ultraviolet light may be irradiated on the photocurable resin from the rear surface 683B side of the base portion 683 in the state where the upper end portion 93A of the support member 93 is held.

Figure 19A:
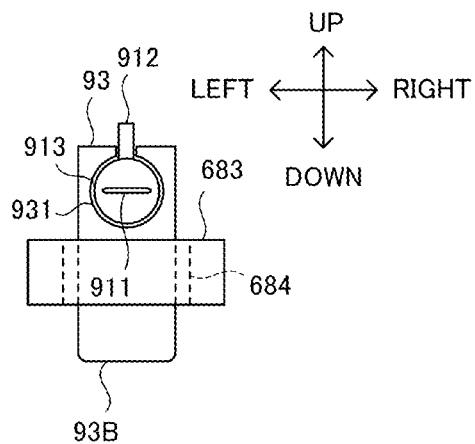
FIGS. 19A-19C are diagrams for explaining the function of the adjustment mechanism of the optical scanning device according to the third embodiment of the present disclosure.
Figure 19B:
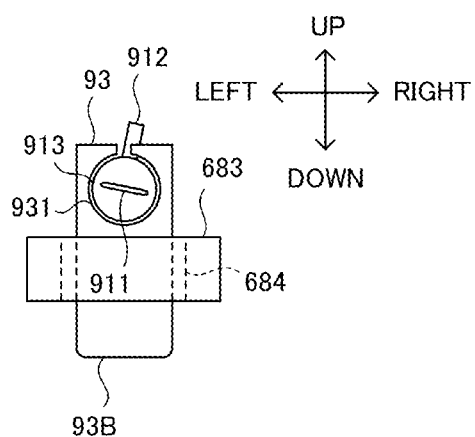
Figure 19C:
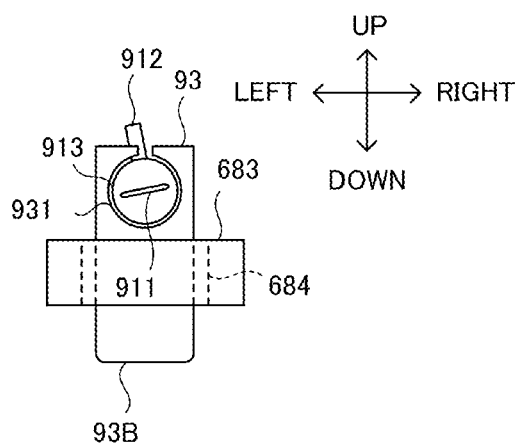

FIGS. 19A-19C are front views showing the state where the support member 93 is inserted in the pass-through portion 684 of the base portion 683. In the support member 93, as shown in FIG. 19A, the cylindrical portion 913 of the aperture 91 is pivotably supported by the cylinder supporting portion 931. In addition, as shown in FIGS. 19B and 19C, when the operation portion 912 is moved in the left-right direction, the aperture 91 pivots around the center of the opening of the cylinder supporting portion 931 and the center of the cylindrical portion 913 as the pivoting axis. With this configuration, when the optical scanning device 6 is assembled, it is possible to adjust the inclination around the optical axis of the laser beam on the polygon mirror 62. In particular, in the optical scanning device 6 of the third embodiment, the inclination around the optical axis of the laser beam can be adjusted at the apertures 91, among the apertures 91 and the aperture 92, that are each disposed between the collimator lens 81 and the cylindrical lens 77 and restrict the beam path width in the sub scanning direction D2. As a result, it is possible to correct the inclination of the laser beam before the laser beam is incident in the cylindrical lens 77, and correct the inclination of the laser beam on the polygon mirror 62. It is noted that the inclination around the optical axis of the laser beam occurs, for example, due to an installation error of various types of mirrors that are disposed in the light source unit 61.

Figure 20:
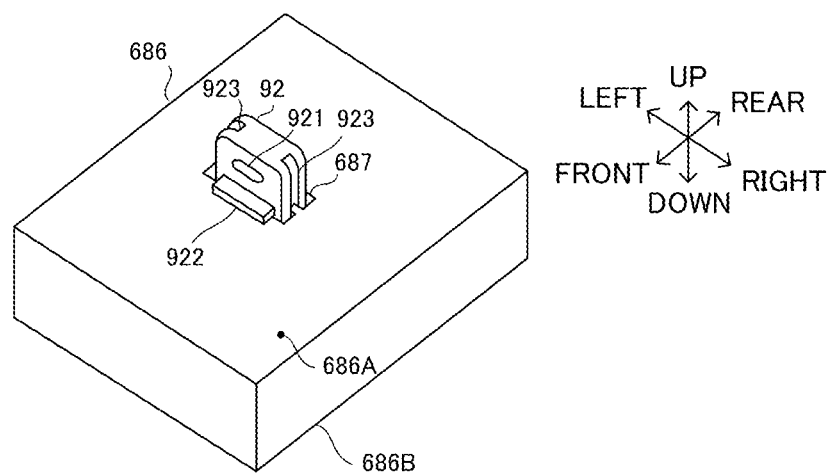
FIG. 20 is a diagram showing components of the optical scanning device according to the third embodiment of the present disclosure.
Figure 21:
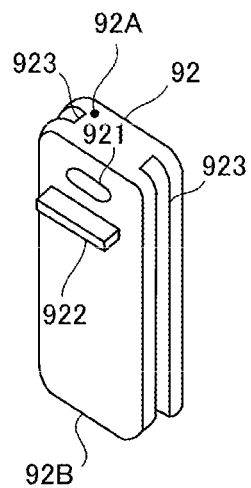
FIG. 21 is a diagram showing components of the optical scanning device according to the third embodiment of the present disclosure.
Figure 22:
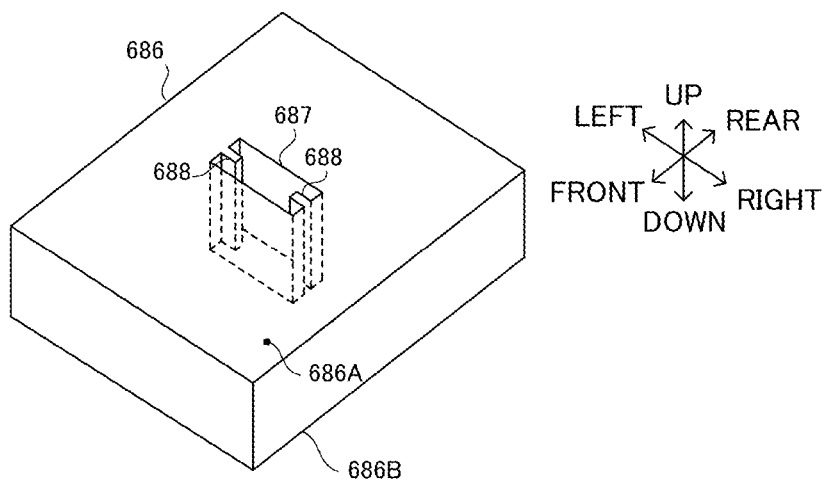
FIG. 22 is a diagram showing components of the optical scanning device according to the third embodiment of the present disclosure.

FIGS. 20-22 are diagrams showing the configuration of the aperture 92 and the base portion 686. As shown in FIG. 20, the base portion 686 includes the pass-through portion 687 that passes through between a front surface 686A and a rear surface 686B of the base portion 686, wherein the aperture 92 can be inserted in the pass-through portion 687. The aperture 92 is fixed to the base portion 686 by adhesion fixing using adhesive in the state where the aperture 92 is inserted in the pass-through portion 687. It is noted that the base portion 686 is an example of the first base portion.

In addition, as shown in FIGS. 20 and 21, the aperture 92 includes an opening portion 921, a restriction portion 922, and groove portions 923. The opening portion 921 is formed to extend from the front surface to the rear surface of the aperture 92. The opening portion 921 is configured to restrict the beam path width of the laser beam in the main scanning direction D1 to a width in a predetermined range, the laser beam traveling from the cylindrical lens 77 to the polygon mirror 62. Specifically, the opening portion 921 has predetermined widths in the main scanning direction D1 and the sub scanning direction D2, and the width in the main scanning direction D1 is smaller than that of the opening portion 911 of the apertures 91. Here, the aperture 92 is an example of the first aperture, and the opening portion 921 is an example of the first opening portion.

The restriction portion 922 is formed to project from the aperture 92 in the axis direction of the laser beam, and restricts the downward movement of the aperture 92 in the pass-through portion 687. It is noted that the groove portions 923 are formed to extend from the upper end to the lower end of the aperture 92.

As shown in FIG. 22, the pass-through portion 687 formed in the base portion 686 includes restriction portions 688 that are projections respectively projecting from the left and right end portions toward the inside of the pass-through portion 687, and can be inserted in the groove portions 923 of the aperture 92. The restriction portions 688 are formed to extend between the front surface and the rear surface of the base portion 686. In addition, the restriction portions 688, when inserted in the groove portions 923 of the aperture 92, restrict the movement of the aperture 92 in the front-rear direction. On the other hand, in the pass-through portion 687, the movement of the aperture 92 in the left-right direction (the main scanning direction D1) that is perpendicular to the pivoting axis of the aperture 92 is allowed within a predetermined adjustment range. Here, the pass-through portion 687 is an example of the first pass-through portion.

Figure 23:
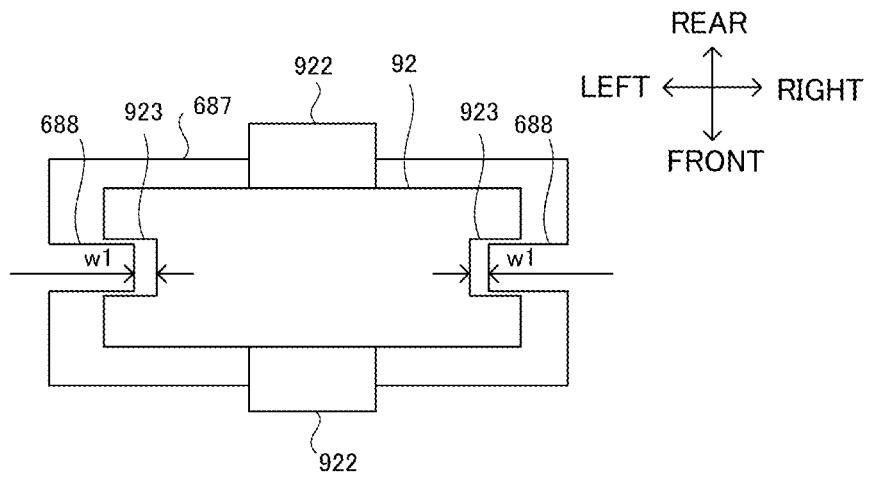
FIG. 23 is a diagram for explaining the function of the adjustment mechanism of the optical scanning device according to the third embodiment of the present disclosure.

In the aperture 92 which is configured as described above, after the aperture 92 is inserted in the pass-through portion 687 of the base portion 686, it is possible to adjust the position of the aperture 92 in the left-right direction. Here, FIG. 23 is a schematic diagram, viewed from above, showing the state where the aperture 92 is inserted in the pass-through portion 687 of the base portion 686. As shown in FIG. 23, in the state where the aperture 92 is inserted in the pass-through portion 687, a gap with a predetermined adjustment width w1 is formed in each of the left and right groove portions 923, wherein the adjustment width w1 is set with respect to the restriction portions 688 in advance and extends in the left-right direction. That is, in this state, the aperture 92 can be moved in the main scanning direction D1 in the pass-through portion 688 within a width range that is twice as large as the adjustment width w1. With this configuration, when the optical scanning device 6 is assembled, it is possible to adjust the incident position of the laser beam in the main scanning direction D1 on the polygon mirror 62.

In the optical scanning device 6, after the position of the aperture 92 in the left-right direction in the pass-through portion 687 is adjusted, the aperture 92 is fixed to the base portion 686 by adhesion fixing using adhesive. At this time, for example, a photocurable resin that is cured by ultraviolet irradiation is used as the adhesive. In that case, it is necessary to irradiate ultraviolet light on the photocurable resin after the photocurable resin is applied to the aperture 92 and the pass-through portion 687. Here, if the aperture 92 could be held only by the upper end portion 92A of the aperture 92, the chuck portion of the robot arm or the hand of the worker that would be holding the aperture 92 would interrupt with the application of the photocurable resin and the irradiation of the ultraviolet light on the photocurable resin.

In the optical scanning device 6, however, the lower end portion 92B of the aperture 92 projects from the rear surface 686B of the base portion 686 in the state where the aperture 92 has been inserted in the pass-through portion 687 to such a position where the laser beam is incident in the opening portion 921 of the aperture 92. As a result, it is possible to apply the photocurable resin to the aperture 92 and the pass-through portion 687 and irradiate the ultraviolet light on the photocurable resin from above in the state where the chuck portion of the robot arm or the hand of the worker is holding the lower end portion 92B of the aperture 92 on the rear surface 686B side of the base portion 686. It is noted that the photocurable resin may be applied to the aperture 92 and the pass-through portion 687 from the rear surface 686B side of the base portion 686 and the ultraviolet light may be irradiated on the photocurable resin from the rear surface 686B side of the base portion 686 in the state where the upper end portion 92A of the aperture 92 is held.

As described above, the optical scanning device 6 according to the third embodiment includes an adjustment mechanism that can adjust the incident position of a laser beam in the main scanning direction D1 on the polygon mirror 62, the incident angle of the laser beam in the sub scanning direction D2, and the inclination around the optical axis of the laser beam. In addition, the adjustment mechanism has a simple configuration where a screw or the like is not used. This makes it possible to reduce the number of parts and the cost. Furthermore, the configuration facilitates the work of fixing the support member 93 and the aperture 92 to the base portion 683 and the base portion 686 by adhesion fixing. As a result, it is possible to fix the support member 93 and the aperture 92 stably in a desired fixed state by using adhesive such as photocurable resin.

[Aperture Fixing Method in Optical Scanning Device 6 of Third Embodiment]

Figure 24:
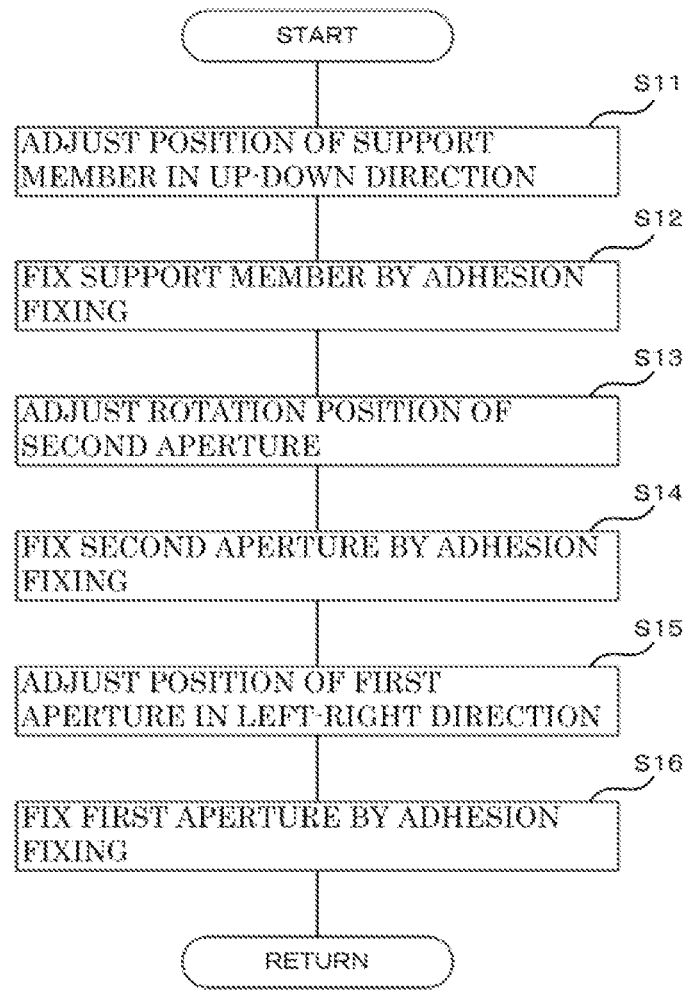
FIG. 24 is a flowchart for explaining an aperture fixing method used in the optical scanning device according to the third embodiment of the present disclosure.

Here, with reference to FIG. 24, a description is given of the work process executed as a fixing method of the apertures 91 and the aperture 92 in the optical scanning device 6 of the third embodiment. The work process is executed by, for example, a robot arm or a worker who performs the assembling of the optical scanning device 6.

First, in step S11, the position of the aperture 91 in the up-down direction (the sub scanning direction D2) which is perpendicular to the pivoting axis of the aperture 91 is adjusted by moving the support member 93 in the pass-through portion 744 of the base portion 683.

Next, in step S12, the support member 93 whose position has been adjusted in the step S11 is fixed to the base portion 683 by adhesion fixing using adhesive. Here, a photocurable resin that is cured by ultraviolet irradiation is used as the adhesive. More specifically, the photocurable resin is applied to between the support member 93 and the pass-through portion 744, and then ultraviolet light is irradiated on the photocurable resin. At this time, since the lower end portion 93B of the support member 93 projects from the bottom surface of the base portion 683, it is possible to perform with ease the application of the photocurable resin and the irradiation of ultraviolet light on the photocurable resin from above the base portion 683, in the state where the lower end portion 93B of the support member 93 is held.

Subsequently, in step S13, the rotation position of the aperture 91 is adjusted by pivoting the aperture 91 by operating the operation portion 912 of the aperture 91 supported by the support member 93 fixed to the base portion 683.

In step S14, the aperture 91 whose rotation position has been adjusted in the step S13 is fixed to the support member 93 by adhesion fixing using adhesive. In this case, too, a photocurable resin that is cured by ultraviolet irradiation is used as the adhesive. More specifically, the photocurable resin is applied to between the cylindrical portion 913 of the aperture 91 and the cut portion 932 of the support member 93, and then ultraviolet light is irradiated on the photocurable resin. At this time, since the operation portion 912 of the aperture 91 projects upward from the cylindrical portion 913, it is possible to perform with ease the application of the photocurable resin to the cut portion 932 and the irradiation of ultraviolet light on the photocurable resin in the state where the operation portion 912 of the aperture 91 is held.

Subsequently, in step S15, the position of the aperture 92 in the left-right direction (the main scanning direction D1), which is perpendicular to the pivoting axis of the aperture 92, is adjusted by moving the aperture 92 in the pass-through portion 687 of the base portion 686.

In step S16, the aperture 92 whose position has been adjusted in the step S15 is fixed to the base portion 686 by adhesion fixing using adhesive. Here, a photocurable resin that is cured by ultraviolet irradiation is used as the adhesive. More specifically, the photocurable resin is applied to between the aperture 92 and the pass-through portion 687, and then ultraviolet light is irradiated on the photocurable resin. At this time, since the lower end portion 92B of the aperture 92 projects from the bottom surface of the base portion 686, it is possible to perform with ease the application of the photocurable resin and the irradiation of ultraviolet light on the photocurable resin from above the base portion 686, in the state where the lower end portion 92B of the aperture 92 is held.

[Fourth Embodiment]

Meanwhile, the adjustment of the fixed state of the apertures 91 and the aperture 92 may be performed while photographing the laser beam by a camera including an imaging element such as CCD. For example, during the adjustment work, the camera may be disposed between the reflection mirrors 71-74 and the reflection mirror 75, or between the cylindrical lens 77 and the polygon mirror 62, and after the adjustment work, the camera may be removed.

Figure 25A:
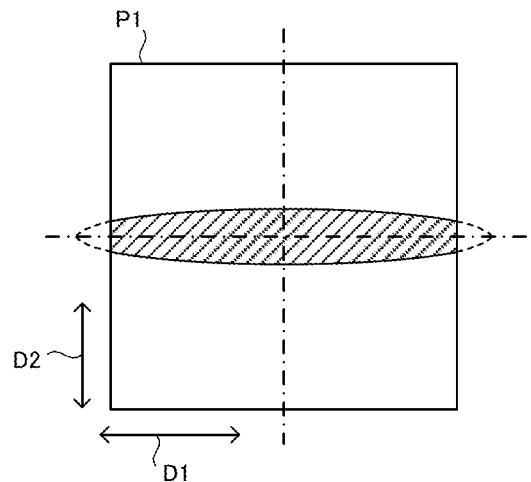
FIGS. 25A-25D are diagrams showing examples of photographed images taken by a camera used for the aperture fixing method in the optical scanning device according to the third embodiment of the present disclosure.

However, when, for example, the focal distance of a scanning lens such as an Fθ lens mounted in the optical scanning device 6 is long, the beam width in the main scanning direction D1 increases after the laser beam passes through the aperture 92. When the size of the camera is small relative to the width of the laser beam in the main scanning direction D1, the end portions of the laser beam in the main scanning direction D1 may not be included in a photographed image P1 taken by the camera, as shown in FIG. 25A. It is noted that, as shown in FIGS. 25A-25D, the camera is disposed in the optical scanning device 6 in the state where the left-right direction of the photographed image P1 is parallel to the main scanning direction D1, and the up-down direction thereof is parallel to the sub scanning direction D2. It is noted that, in FIGS. 25A-25D, the laser beam is represented by the hatched area.

Here, it may be considered to use a large-size camera to photograph the laser beam in its entirety in the main scanning direction D1. However, in that case, the setting position of the camera in the optical scanning device 6 is restricted when the fixed state of the aperture 92 is adjusted.

On the other hand, the image forming apparatus 10 according to the fourth embodiment described herewith has a configuration where a small-size camera can be used when the fixed state of the aperture 92 is adjusted. It is noted that the components that are the same as those of the image forming apparatus 10 and the optical scanning device 6 described in the third embodiment are assigned the same reference signs, and description thereof is omitted.

Figure 26:
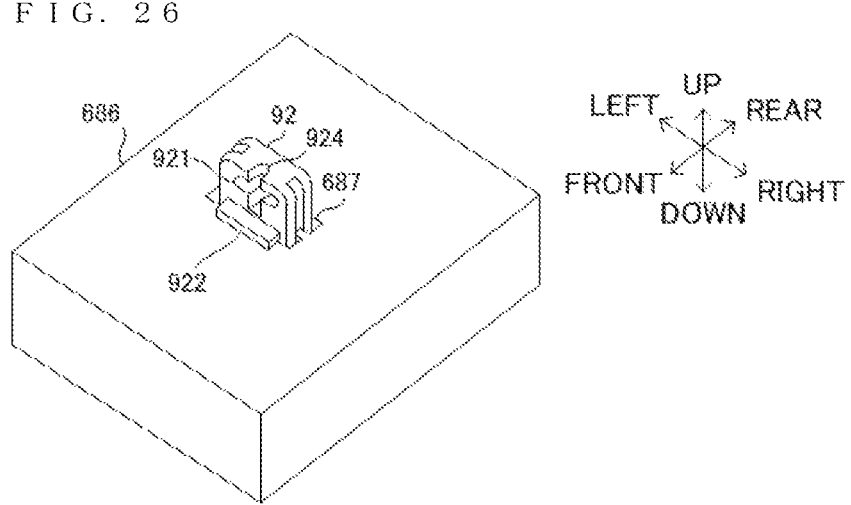
FIG. 26 is a diagram showing a main part of an optical scanning device according to the fourth embodiment of the present disclosure.

Specifically, in the image forming apparatus 10 according to the fourth embodiment, as shown in FIG. 26, the aperture 92 includes a cut portion 924 in which a blocking member 925 that is described below can be inserted in a direction perpendicular to the longitudinal direction of the opening portion 921. Here, the cut portion 924 is an example of the first cut portion, and the blocking member 925 is an example of the first blocking member. The cut portion 924 is formed at a predetermined position such that the center thereof in the main scanning direction D1 matches the center of the opening portion 921 in the main scanning direction D1. The cut portion 924 is an indent portion formed on the surface (namely, the front surface) of the aperture 92 on the downstream side in the emission direction of the laser beam, and does not pass through the aperture 92 in a direction along the optical axis of the laser beam. As a result, the cut portion 924 does not affect the performance of the opening portion 921 of the aperture 92 in restricting the width of the laser beam.

Figure 25B:
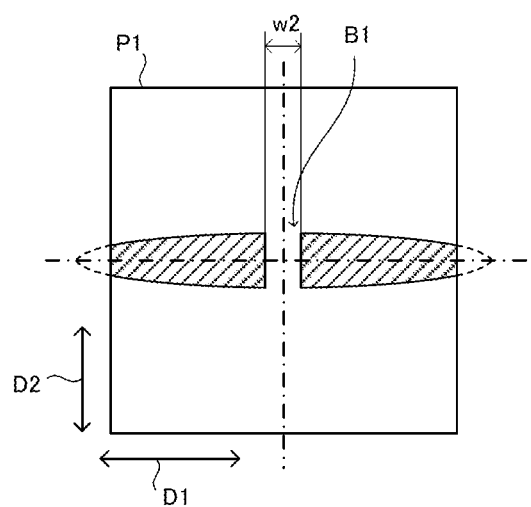
Figure 27:
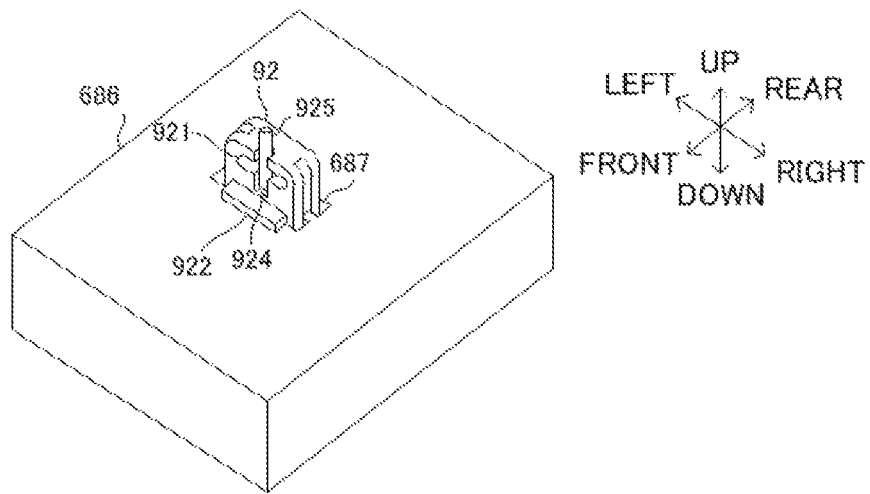
FIG. 27 is a diagram showing the main part of the optical scanning device according to the fourth embodiment of the present disclosure.

As shown in FIG. 27, the blocking member 925 which is in the shape of a long cylinder can be attached to and detached from the cut portion 924, wherein the blocking member 925 blocks the laser beam emitted from the laser diode 614A. Here, when the laser beam after passing through the opening portion 921 is photographed in the state where the blocking member 925 is inserted in the cut portion 924, in the photographed image P1 taken by the camera, a part of the laser beam emitted from the laser diode 614A is blocked by the blocking member 925, as shown in FIG. 25B. At this time, a blocked area B1 that is formed in the laser beam by the blocking member 925 has a predetermined relationship with the opening portion 921 of the aperture 92. That is, the center of the opening portion 921 in the longitudinal direction thereof matches the center of the blocked area B1 in the same direction. It is noted that a border line between the blocked area B1 and the laser beam forms a line segment that is perpendicular to the longitudinal direction of the opening portion 921.

With the above-described configuration, it is possible to identify the center position of the laser beam in the main scanning direction D1, based on the photographed image P1. More specifically, the center position of the laser beam is where the center of a width w2 passes through the center between the border lines of the blocked area B1 with the laser beam, wherein the width w2 extends in a direction perpendicular to the border lines. As a result, even when one or both ends of the laser beam are not included in the photographed image taken by the camera as shown in FIG. 25B, it is possible, by referring to the blocked area B1, to identify the center position of the laser beam, and adjust with ease the fixed position of the aperture 92 in the main scanning direction D1 (the left-right direction).

Figure 28:
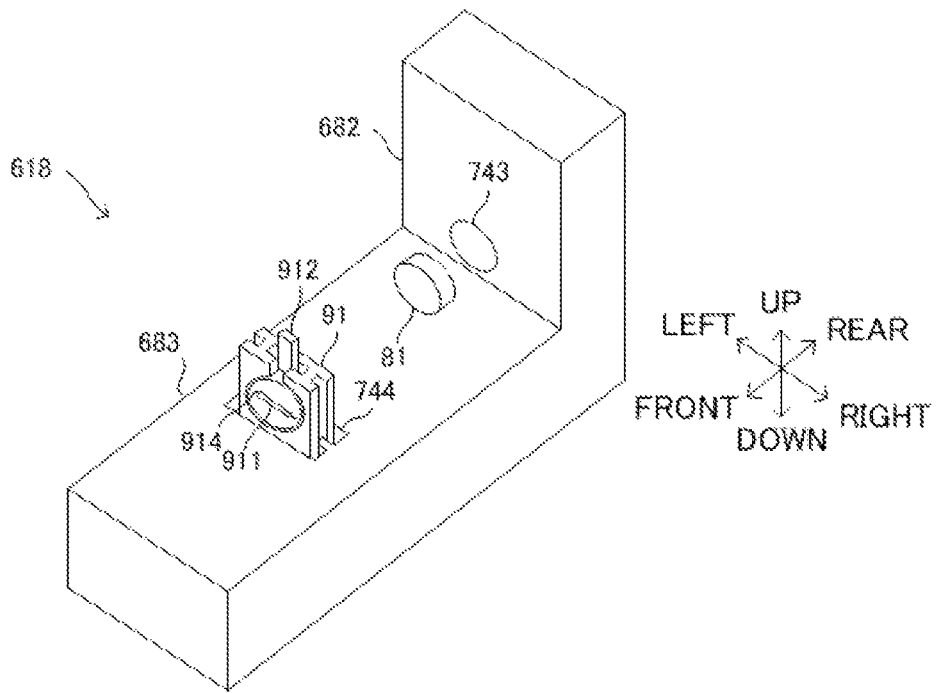
FIG. 28 is a diagram showing an outgoing optical system of the optical scanning device according to the fourth embodiment of the present disclosure.

In addition, as shown in FIG. 28, in the image forming apparatus 10 according to the fourth embodiment, the opening portion 911 may include cut portions 914 in which a blocking member 915 that is described below can be inserted in a direction parallel to the longitudinal direction of the opening portion 911. Here, the cut portions 914 are an example of the second cut portion, and the blocking member 915 is an example of the second blocking member. The cut portions 914 are formed at a predetermined position such that the center thereof in the sub scanning direction D2 matches the center of the opening portion 911 in the sub scanning direction D2. The cut portions 914 are indent portions formed on the surface (namely, the front surface) of the aperture 91 on the downstream side in the emission direction of the laser beam, and does not pass through the aperture 91 in a direction along the optical axis of the laser beam. As a result, the cut portions 914 do not affect the performance of the opening portion 911 of the aperture 91 in restricting the width of the laser beam.

Figure 25C:
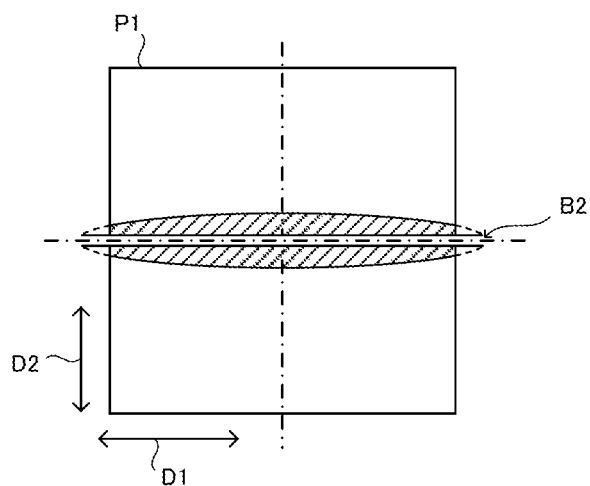
Figure 29:
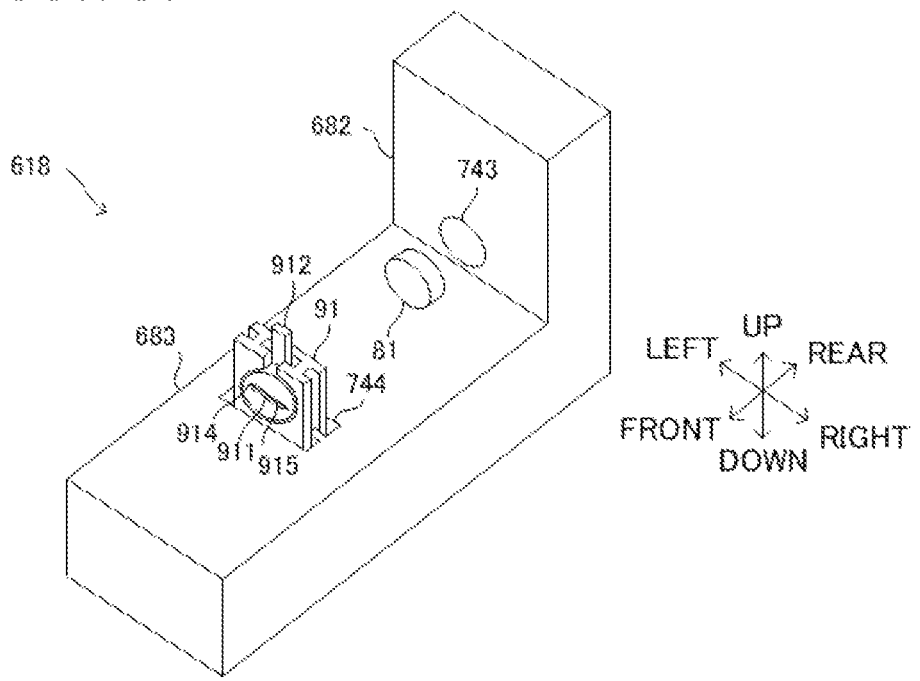
FIG. 29 is a diagram showing the outgoing optical system of the optical scanning device according to the fourth embodiment of the present disclosure.

As shown in FIG. 29, the blocking member 915 which is in the shape of a long cylinder can be attached to and detached from the cut portions 914, wherein the blocking member 915 blocks the laser beam emitted from the laser diode 614A. Here, when the laser beam after passing through the opening portion 911 is photographed in the state where the blocking member 915 is inserted in the cut portions 914, in the photographed image P1 taken by the camera, a part of the laser beam is blocked by the blocking member 915, as shown in FIG. 25C. At this time, a blocked area B2 that is formed in the laser beam by the blocking member 915 has a predetermined relationship with the opening portion 911 of the aperture 91. That is, the longitudinal direction of the opening portion 911 and the longitudinal direction of the blocked area B2 are parallel to each other, and a border line between the blocked area B2 and the laser beam forms a line segment that is parallel to the longitudinal direction of the opening portion 911.

Figure 25D:
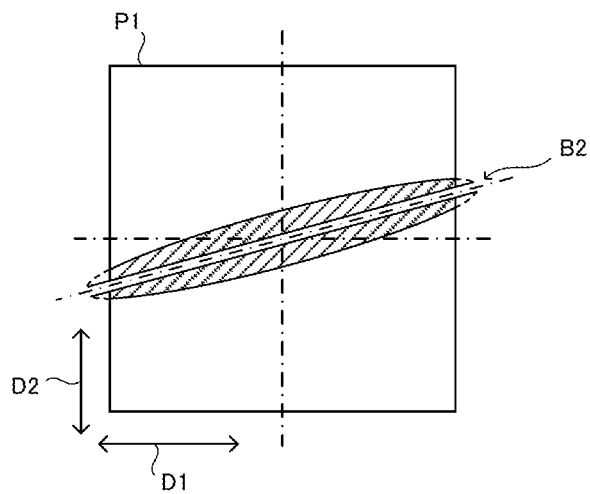

With the above-described configuration, it is possible to identify the inclination of the laser beam based on the photographed image P1. As a result, even when one or both ends of the laser beam are not included in the photographed image taken by the camera as shown in FIG. 25D, it is possible, by referring to the blocked area B2, to identify the inclination of the laser beam, and adjust with ease the rotation position of the aperture 91 rotated around the pivoting axis of the aperture 91.

As described above, according to the image forming apparatus 10 of the fourth embodiment, it is possible to use a small-size camera when the fixed state of the aperture 91 and the aperture 92 is adjusted, resulting in relaxation of the restriction made to the setting position of the camera in the optical scanning device 6.

More specifically, in the optical scanning device 6 of the fourth embodiment, the following work process is executed in the work process executed as the fixing method of the apertures 91 and the aperture 92.

First, in the steps S11-S14, the laser beam after passing through the opening portion 911 is photographed by a camera installed at a predetermined position, in the state where the blocking member 915 is inserted in the cut portions 914 of the aperture 91. Next, the inclination of the laser beam after passing through the opening portion 911 is identified based on the photographed image taken by the camera. Subsequently, the rotation position of the aperture 91 in the support member 93 is adjusted based on the identified inclination of the laser beam. In addition, the position of the support member 93 in the sub scanning direction D2 is adjusted based on the photographed image taken by the camera.

Next, in the steps S15-S16, the blocking member 915 is removed from the cut portions 914, and the laser beam after passing through the opening portion 921 is photographed by the camera installed at the predetermined position, in the state where the blocking member 925 is inserted in the cut portion 924 of the aperture 92. Subsequently, the center position of the laser beam in the longitudinal direction (the main scanning direction D1) of the opening portion 921, after passing through the opening portion 921, is identified based on the photographed image taken by the camera. The fixed state of the aperture 92 is then adjusted based on the identified center position of the laser beam in the longitudinal direction of the opening portion 921.

It is noted that the laser beam after passing through the opening portion 921 may be photographed by the camera, in the state where the blocking member 915 is inserted in the cut portions 914 and the blocking member 925 is inserted in the cut portion 924, and the rotation position of the apertures 91 and the fixed state of the aperture 92 may be adjusted. In that case, for example, the camera may be disposed between the cylindrical lens 77 and the polygon mirror 62. This allows, in the photographed image taken by the camera, both the blocked area B1 and the blocked area B2 to be formed in the laser beam.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An optical scanning device comprising:
    a cylindrical aperture in which an opening portion is formed, the opening portion restricting a beam path width of a laser beam emitted from a light source;
    a support member including a cylinder supporting portion that pivotably supports the aperture; and
    a base portion to which the support member is fixed by adhesion fixing, wherein
    the base portion includes a pass-through portion that is formed to pass through between a front surface and a rear surface of the base portion and allows the support member to move in a direction perpendicular to a pivoting axis of the aperture, and
    the support member has a length such that a lower end portion thereof projects from a rear surface of the base portion in a state where the support member has been inserted in the pass-through portion of the base portion to such a position where the laser beam is incident in the opening portion of the aperture.

2. The optical scanning device according to claim 1, wherein
    the aperture includes an operation portion that projects upward from the support member in a state where the aperture is supported by the cylinder supporting portion.

3. The optical scanning device according to claim 1, wherein
    the pass-through portion includes a restriction portion that restricts movement of the support member in a direction along the pivoting axis of the aperture.

4. The optical scanning device according to claim 1, wherein
    the base portion is a housing of the optical scanning device.

5. An image forming apparatus comprising the optical scanning device according to claim 1.

6. An aperture fixing method for use in the optical scanning device according to claim 1, the aperture fixing method comprising:
    a first step of adjusting a position of the support member in a direction perpendicular to the pivoting axis of the aperture, by moving the support member in the pass-through portion of the base portion;
    a second step of fixing the support member whose position has been adjusted in the first step, to the base portion by adhesion fixing;
    a third step of adjusting a rotation position of the opening portion around the pivoting axis of the aperture, by pivoting the aperture supported by the support member that has been fixed to the base portion; and
    a fourth step of fixing the aperture whose rotation position has been adjusted in the third step, to the support member by adhesion fixing.

7. The aperture fixing method according to claim 6, wherein
    a photocurable resin is used in the adhesion fixing in either or both of the second step and the fourth step, the photocurable resin being cured by ultraviolet irradiation.

* * * * *